United States Patent
Fischer et al.

(10) Patent No.: US 8,696,022 B2
(45) Date of Patent: Apr. 15, 2014

(54) AIR BAG WITH VARIABLE VENTING

(75) Inventors: Kurt F. Fischer, Leonard, MI (US);
Douglas M. Gould, Lake Orion, MI (US); Daniele Aranzulla, Essingen (DE); Martin Burkhardtsmaier, Schwaebisch Gmund (DE)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 13/482,004

(22) Filed: May 29, 2012

(65) Prior Publication Data

US 2012/0235393 A1  Sep. 20, 2012

Related U.S. Application Data

(63) Continuation-in-part of application No. 13/114,349, filed on May 24, 2011, which is a continuation-in-part of application No. 12/912,800, filed on Oct. 27, 2010.

(51) Int. Cl.
*B60R 21/276* (2006.01)

(52) U.S. Cl.
USPC ........................................ 280/739; 280/743.2

(58) Field of Classification Search
USPC ............................................ 280/743.2, 739
See application file for complete search history.

(56) References Cited

U.S. PATENT DOCUMENTS

| | | | |
|---|---|---|---|
| 5,007,662 A * | 4/1991 | Abramczyk et al. | 280/739 |
| 5,016,913 A | 5/1991 | Nakajima et al. | |
| 5,172,933 A | 12/1992 | Strasser et al. | |
| 5,246,250 A * | 9/1993 | Wolanin et al. | 280/739 |
| 5,280,953 A * | 1/1994 | Wolanin et al. | 280/739 |
| 5,306,043 A | 4/1994 | Mihm et al. | |
| 5,350,188 A | 9/1994 | Sato et al. | |
| 5,405,166 A | 4/1995 | Rogerson | |
| 5,421,607 A | 6/1995 | Gordon | |
| 5,492,363 A | 2/1996 | Hartmeyer et al. | |
| 5,494,314 A | 2/1996 | Kriska et al. | |
| 5,603,526 A | 2/1997 | Buchanan | |
| 5,931,497 A * | 8/1999 | Fischer | 280/743.1 |
| 6,056,318 A | 5/2000 | Braunschadel | |
| 6,095,557 A * | 8/2000 | Takimoto et al. | 280/739 |
| 6,126,196 A | 10/2000 | Zimmerman | |
| 6,139,048 A | 10/2000 | Braunschadel | |
| 6,183,003 B1 | 2/2001 | Matsuhashi | |
| 6,206,408 B1 | 3/2001 | Schneider | |
| 6,247,726 B1 | 6/2001 | Ryan et al. | |
| 6,254,130 B1 * | 7/2001 | Jayaraman et al. | 280/743.2 |
| 6,290,257 B1 | 9/2001 | Bunce et al. | |
| 6,371,509 B1 | 4/2002 | Ellerbrok et al. | |
| 6,398,258 B2 | 6/2002 | Hamada et al. | |

(Continued)

*Primary Examiner* — Nicole Verley
(74) *Attorney, Agent, or Firm* — Tarolli, Sundheim, Covell & Tummino LLP

(57) ABSTRACT

An apparatus (10) for helping to protect an occupant (20) of a vehicle (12) comprises an inflatable vehicle occupant protection device (14) inflatable between a vehicle surface (36) and the vehicle occupant. A vent (160) releases inflation fluid from the protection device (14). The vent (160) includes a vent opening with a flow area that can be adjusted to throttle inflation fluid flow through the vent. A tether (150) has a first connection with the vent (160) and a second connection with the protection device (14). Tension on the tether (150) throttles the vent (160). The second connection of the tether is positioned on the protection device (14) such that deployment of the protection device throttles the vent (160) toward an actuated condition, and occupant (20) penetration into the protection device throttles the vent toward a non-actuated condition.

28 Claims, 13 Drawing Sheets

(56) References Cited

U.S. PATENT DOCUMENTS

| | | |
|---|---|---|
| 6,554,316 B2 | 4/2003 | Schneider et al. |
| 6,631,921 B1 | 10/2003 | Drossler et al. |
| 6,631,922 B2 | 10/2003 | Hess et al. |
| 6,648,371 B2 | 11/2003 | Vendely et al. |
| 6,736,426 B2 * | 5/2004 | Winters et al. ............. 280/743.2 |
| 6,746,045 B2 | 6/2004 | Short et al. |
| 6,773,027 B2 | 8/2004 | Bohn et al. |
| 6,773,030 B2 | 8/2004 | Fischer |
| 6,832,778 B2 | 12/2004 | Pinsenschaum et al. |
| 6,863,304 B2 | 3/2005 | Reiter et al. |
| 6,869,103 B2 * | 3/2005 | Ryan et al. ................. 280/743.2 |
| 6,918,613 B2 | 7/2005 | Short et al. |
| 6,932,385 B2 * | 8/2005 | Hawthorn et al. ............ 280/739 |
| 6,971,671 B2 | 12/2005 | Schneider et al. |
| 6,981,719 B2 * | 1/2006 | Igawa ........................ 280/743.2 |
| 7,059,634 B2 | 6/2006 | Bossecker et al. |
| 7,083,191 B2 | 8/2006 | Fischer |
| 7,083,192 B2 | 8/2006 | Fischer et al. |
| 7,131,664 B1 | 11/2006 | Pang et al. |
| 7,134,691 B2 | 11/2006 | Dunkle et al. |
| 7,152,880 B1 | 12/2006 | Pang et al. |
| 7,210,702 B2 | 5/2007 | Soderquist |
| 7,237,802 B2 | 7/2007 | Rose et al. |
| 7,261,319 B2 * | 8/2007 | DePottey et al. ............. 280/739 |
| 7,328,915 B2 | 2/2008 | Smith et al. |
| 7,347,450 B2 | 3/2008 | Williams et al. |
| 7,360,789 B2 | 4/2008 | Bito et al. |
| 7,364,192 B2 | 4/2008 | Braun et al. |
| 7,377,548 B2 * | 5/2008 | Bauer et al. ................. 280/743.2 |
| 7,396,045 B2 * | 7/2008 | Aranzulla et al. ......... 280/743.2 |
| 7,445,237 B2 * | 11/2008 | Boyle et al. .................. 280/739 |
| 7,568,729 B2 * | 8/2009 | Schnieder et al. ............ 280/739 |
| 7,597,355 B2 * | 10/2009 | Williams et al. ............. 280/739 |
| 7,597,356 B2 * | 10/2009 | Williams ...................... 280/739 |
| 7,614,653 B2 * | 11/2009 | Rose et al. .................... 280/739 |
| 7,625,008 B2 | 12/2009 | Pang et al. |
| 7,651,130 B2 * | 1/2010 | Bauberger ................. 280/743.2 |
| 7,722,079 B2 * | 5/2010 | Lee et al. ...................... 280/739 |
| 7,722,080 B2 * | 5/2010 | Rose et al. ................. 280/743.2 |
| 7,726,685 B2 * | 6/2010 | Abe et al. ...................... 280/736 |
| 7,748,738 B2 * | 7/2010 | Schneider ...................... 280/740 |
| 7,784,828 B2 * | 8/2010 | Matsu et al. ................... 280/739 |
| 7,789,421 B2 * | 9/2010 | Issler et al. ................. 280/743.2 |
| 7,837,228 B2 * | 11/2010 | Abe ............................ 280/743.1 |
| 7,845,681 B2 * | 12/2010 | Abe et al. .................... 280/743.1 |
| 7,857,346 B2 * | 12/2010 | Reiter et al. ................ 280/743.2 |
| 7,878,538 B2 * | 2/2011 | Abe et al. ...................... 280/739 |
| 7,883,110 B2 * | 2/2011 | Pausch .......................... 280/739 |
| 7,922,197 B2 * | 4/2011 | Fukawatase et al. ......... 280/739 |
| 7,922,200 B2 * | 4/2011 | Webber ...................... 280/743.2 |
| 7,931,297 B2 * | 4/2011 | Abe et al. ...................... 280/739 |
| 7,938,445 B2 | 5/2011 | Smith et al. |
| 7,942,443 B2 * | 5/2011 | Dennis et al. ............. 280/743.2 |
| 7,946,613 B2 | 5/2011 | Rose et al. |
| 7,954,850 B2 * | 6/2011 | Fischer et al. ............. 280/743.1 |
| 7,959,184 B2 * | 6/2011 | Fukawatase et al. ......... 280/739 |
| 7,980,593 B2 | 7/2011 | Kim |
| 8,007,004 B2 | 8/2011 | Kryzaniwskyj et al. |
| 8,020,889 B2 * | 9/2011 | Bauer et al. ................... 280/739 |
| 8,020,891 B2 * | 9/2011 | Fukawatase et al. ......... 280/739 |
| 8,070,183 B2 * | 12/2011 | Kumagai et al. ........... 280/743.2 |
| 8,226,118 B2 * | 7/2012 | Rose et al. ................. 280/743.2 |
| 8,262,130 B2 * | 9/2012 | Fischer et al. ............. 280/743.2 |
| 8,322,748 B2 * | 12/2012 | Abe et al. ...................... 280/739 |
| 2002/0175511 A1 | 11/2002 | Dunkle et al. |
| 2003/0020266 A1 | 1/2003 | Vendely et al. |
| 2003/0020268 A1 | 1/2003 | Reiter et al. |
| 2003/0057691 A1 | 3/2003 | Tokita et al. |
| 2003/0127839 A1 | 7/2003 | Jenkins |
| 2003/0209895 A1 | 11/2003 | Gu et al. |
| 2003/0214125 A1 | 11/2003 | Schneider et al. |
| 2004/0012179 A1 | 1/2004 | Pinsenschaum et al. |
| 2004/0056459 A1 | 3/2004 | Kassman et al. |
| 2004/0090054 A1 | 5/2004 | Bossecker et al. |
| 2004/0130135 A1 | 7/2004 | Ekdahl et al. |
| 2004/0188990 A1 | 9/2004 | Short et al. |
| 2004/0256842 A1 | 12/2004 | Breed |
| 2005/0001412 A1 * | 1/2005 | Schneider et al. ......... 280/730.1 |
| 2005/0052008 A1 * | 3/2005 | Rose et al. .................... 280/740 |
| 2005/0098990 A1 | 5/2005 | Pinsenschaum et al. |
| 2005/0225065 A1 * | 10/2005 | Fujll ........................... 280/743.2 |
| 2005/0236822 A1 | 10/2005 | Rose et al. |
| 2005/0248137 A1 | 11/2005 | Delventhal et al. |
| 2006/0071461 A1 | 4/2006 | Williams et al. |
| 2006/0071462 A1 | 4/2006 | Smith et al. |
| 2006/0151979 A1 | 7/2006 | DePottey et al. |
| 2006/0197327 A1 | 9/2006 | Maripudi et al. |
| 2006/0202454 A1 | 9/2006 | Parizal et al. |
| 2007/0045997 A1 * | 3/2007 | Abe et al. ...................... 280/729 |
| 2007/0052222 A1 | 3/2007 | Higuchi et al. |
| 2007/0108750 A1 * | 5/2007 | Bauer et al. ................... 280/740 |
| 2007/0108753 A1 | 5/2007 | Pang et al. |
| 2007/0126219 A1 | 6/2007 | Williams |
| 2007/0132222 A1 | 6/2007 | Thomas et al. |
| 2007/0145729 A1 * | 6/2007 | Ishiguro et al. ............... 280/739 |
| 2007/0205590 A1 | 9/2007 | Klinkenberger et al. |
| 2007/0205591 A1 * | 9/2007 | Bito ........................... 280/743.2 |
| 2008/0007038 A1 | 1/2008 | Fischer et al. |
| 2008/0018086 A1 | 1/2008 | Ford et al. |
| 2008/0023950 A1 | 1/2008 | Kalczynski et al. |
| 2008/0023959 A1 | 1/2008 | Crawford |
| 2008/0042416 A1 | 2/2008 | Razazi et al. |
| 2008/0073890 A1 * | 3/2008 | Williams et al. ............. 280/739 |
| 2008/0073891 A1 | 3/2008 | Rose et al. |
| 2008/0315567 A1 * | 12/2008 | Fischer et al. ................ 280/732 |
| 2010/0102542 A1 * | 4/2010 | Nakajima et al. .......... 280/743.2 |
| 2010/0201107 A1 * | 8/2010 | Abe et al. .................... 280/730.1 |
| 2011/0198828 A1 * | 8/2011 | Fischer et al. ............. 280/743.2 |
| 2011/0260431 A1 * | 10/2011 | Kwon ...................... 280/730.1 |

* cited by examiner

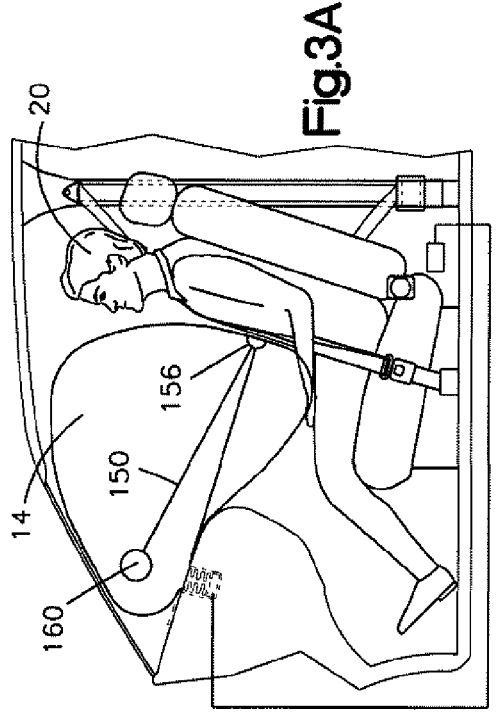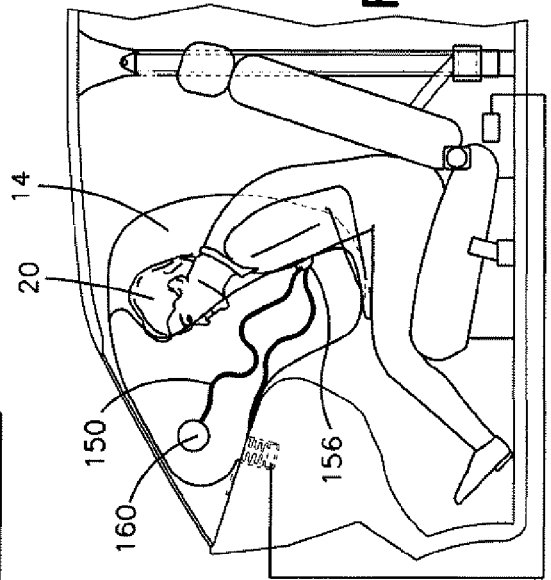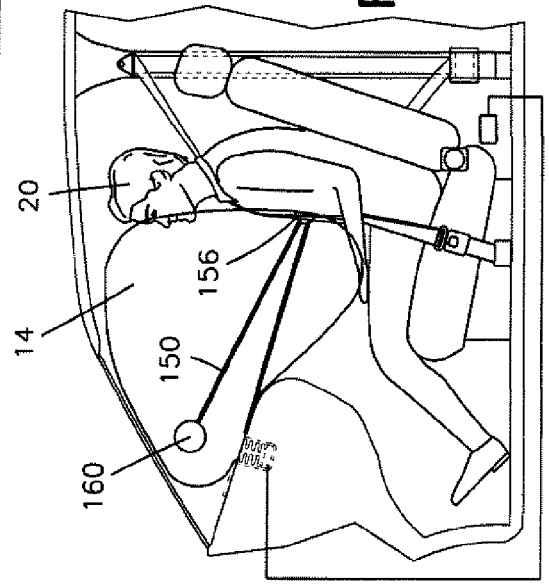

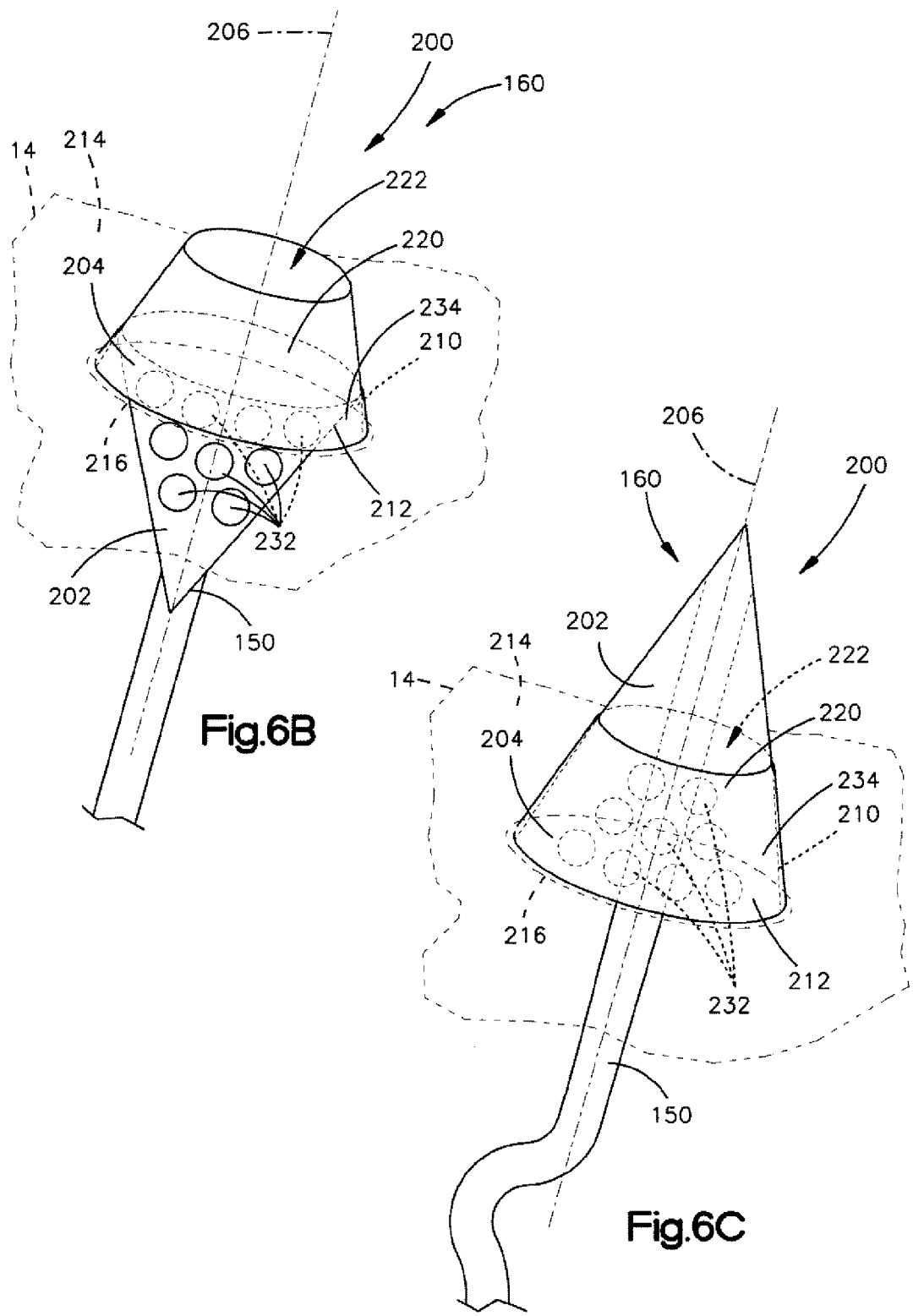

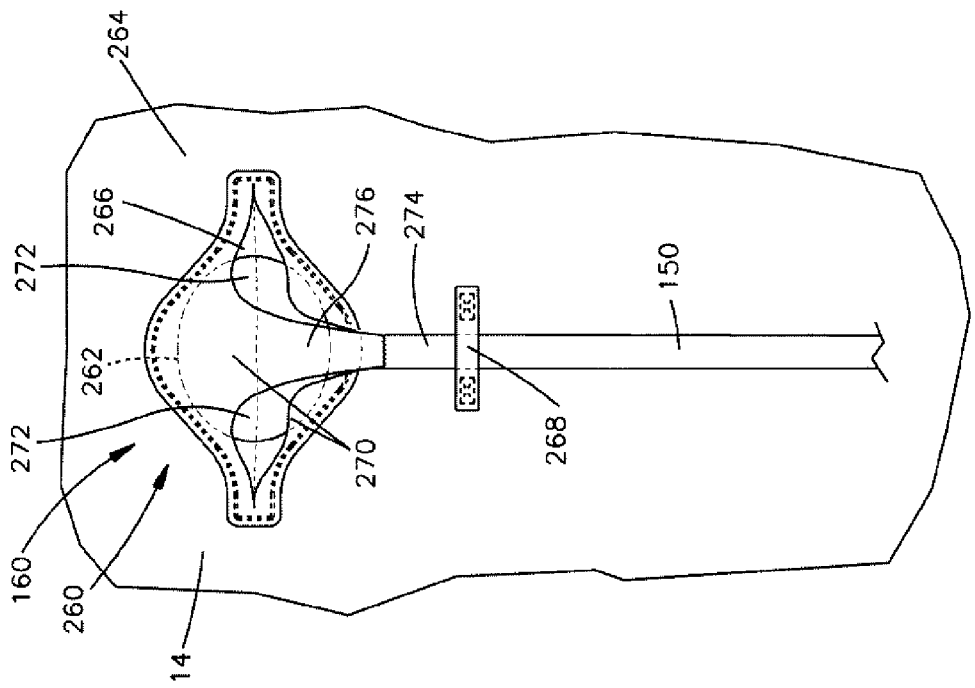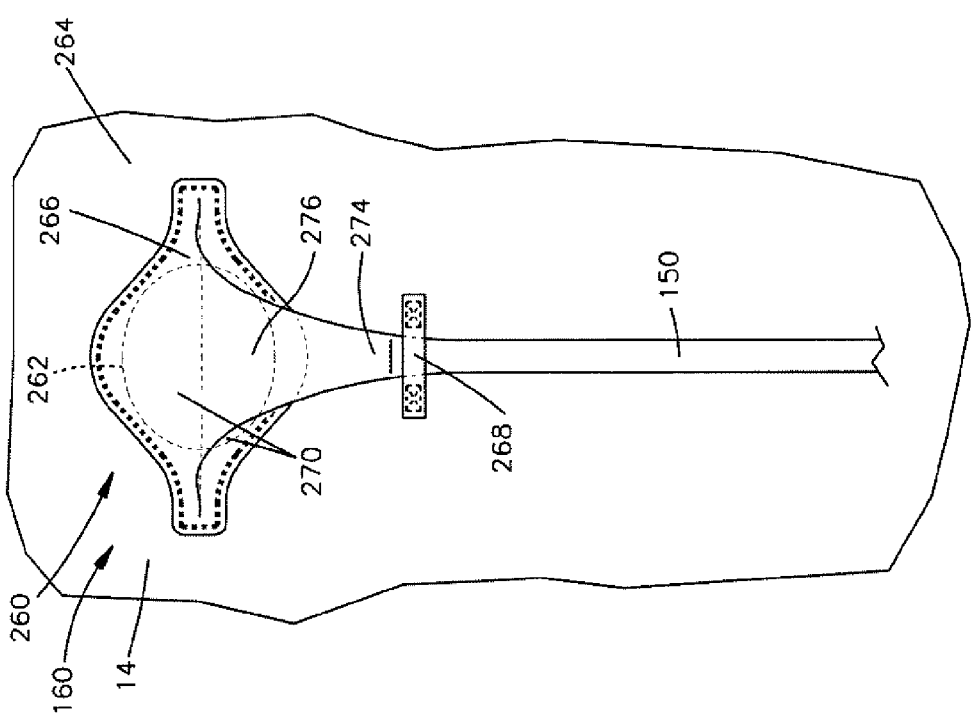

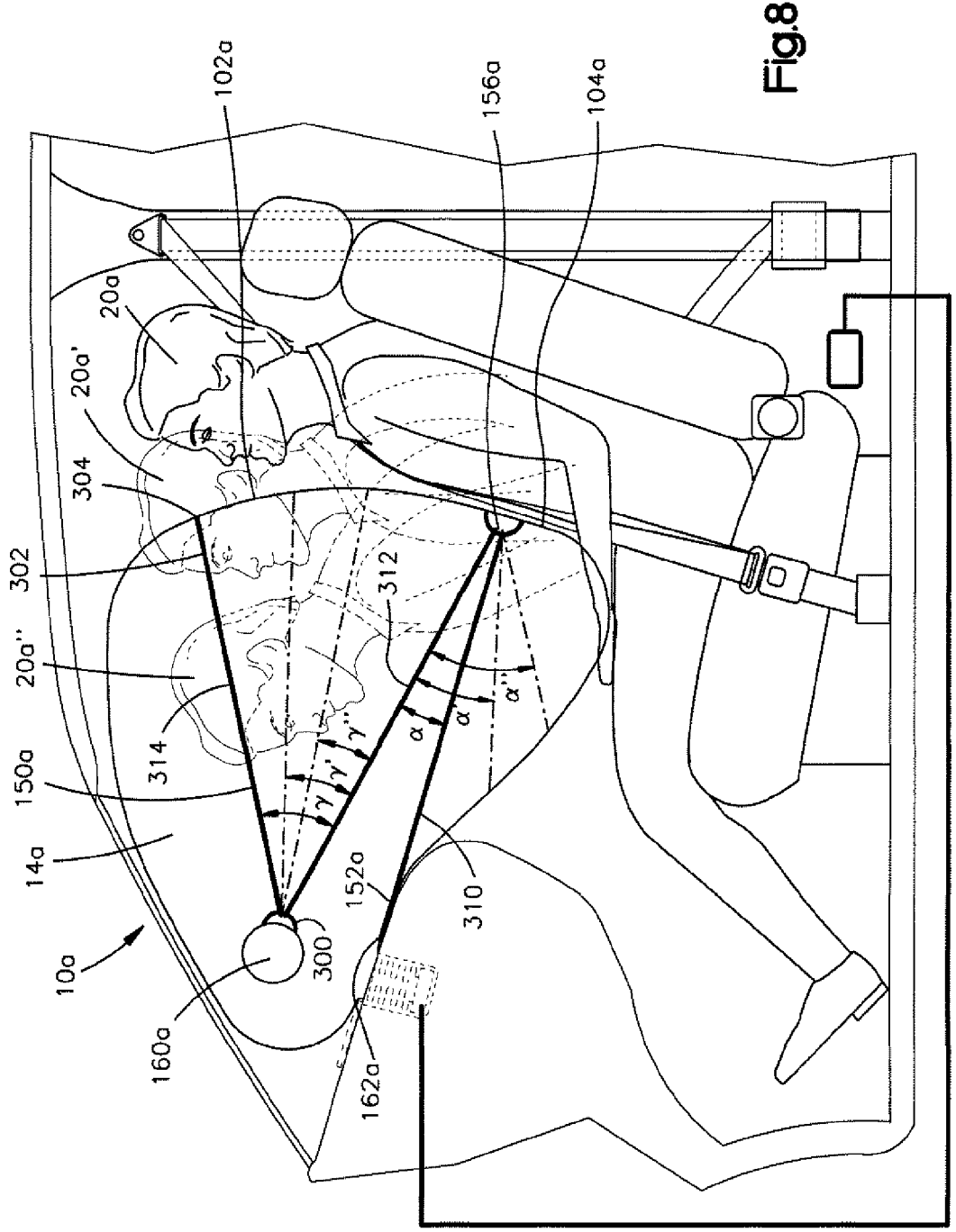

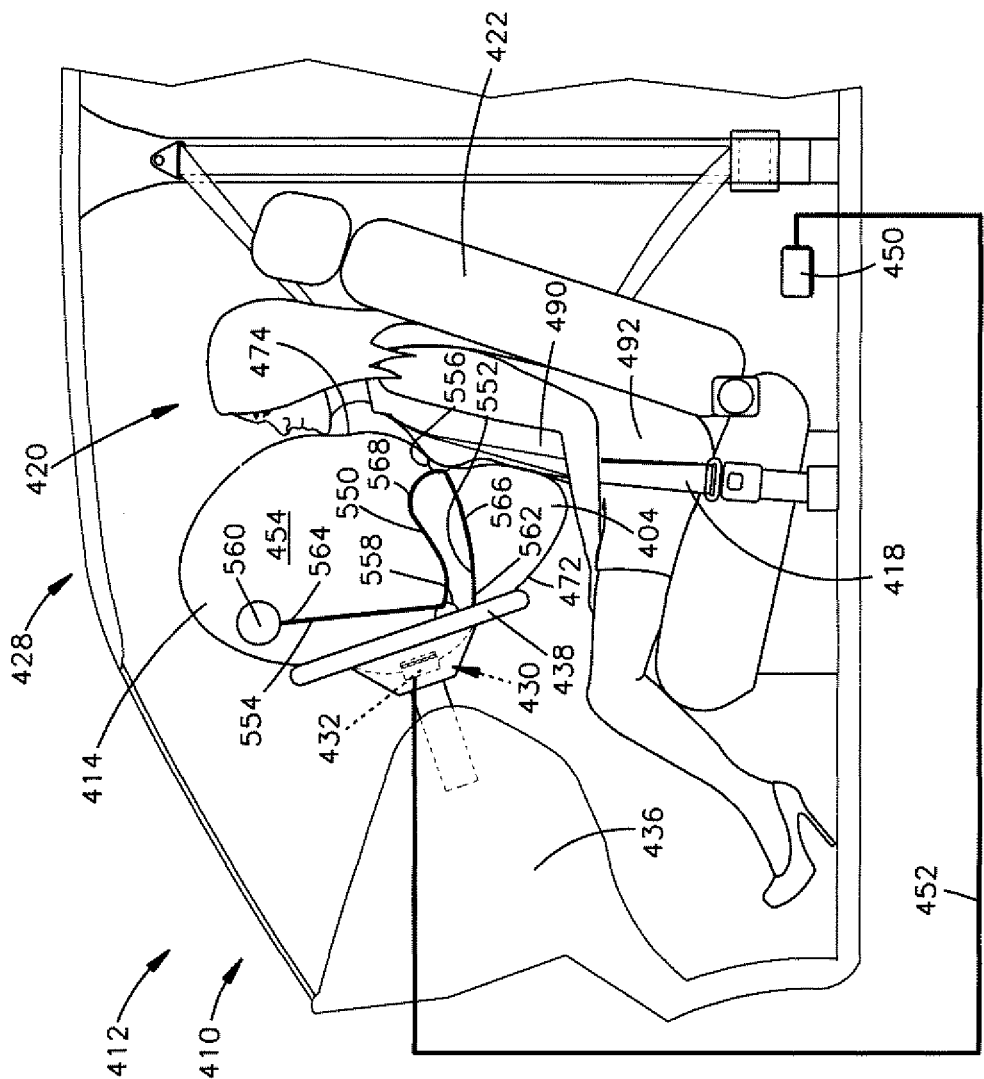

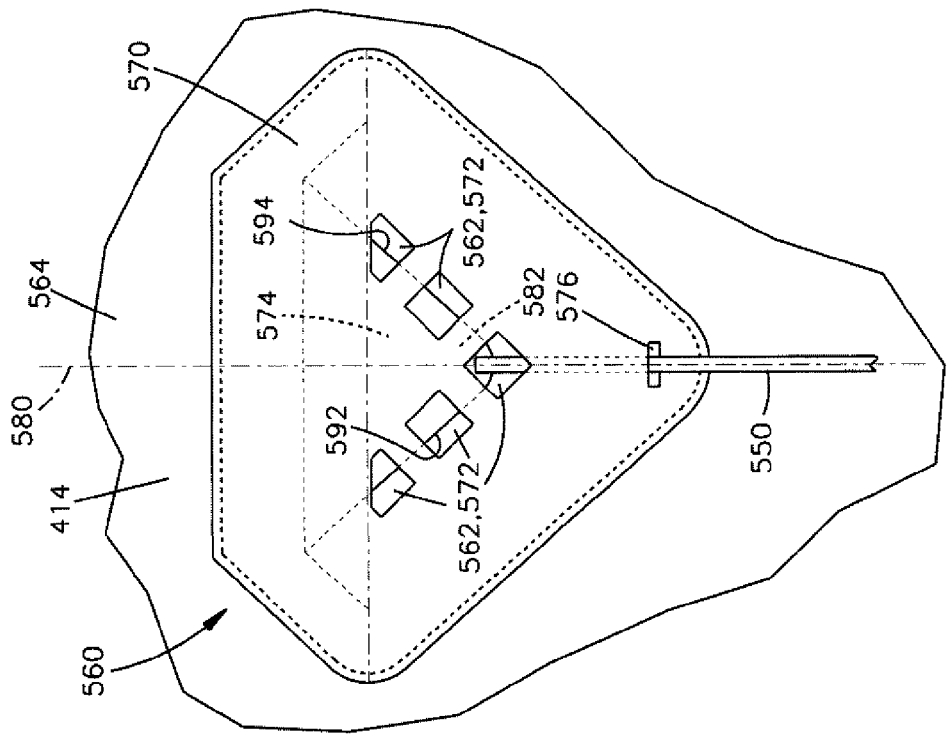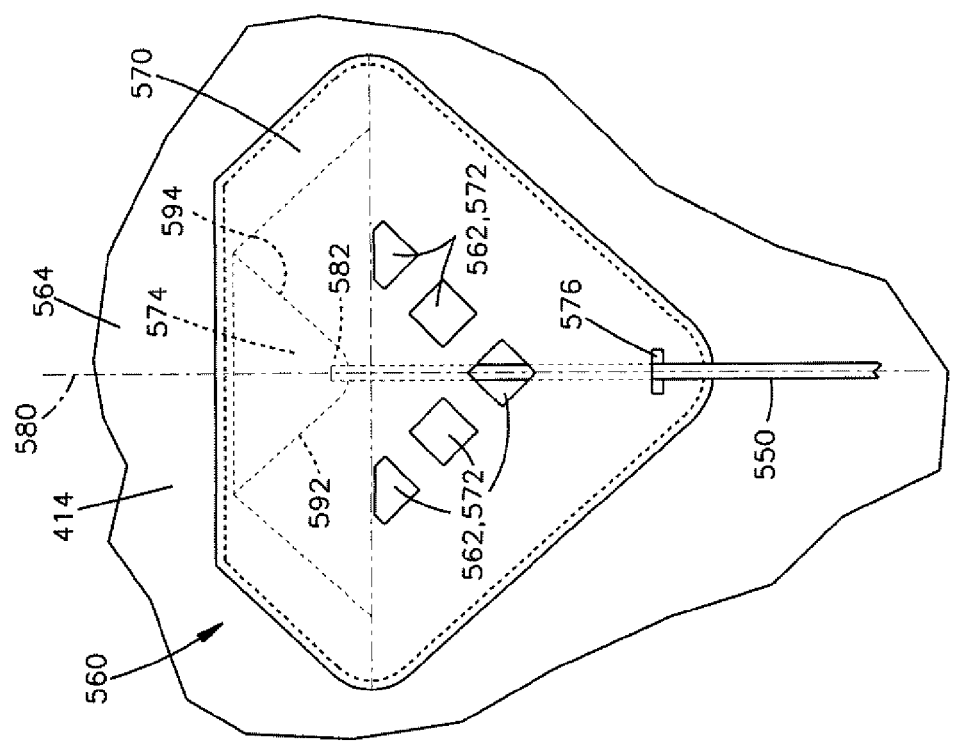

AIR BAG WITH VARIABLE VENTING

RELATED APPLICATIONS

This application is a continuation in part of U.S. patent application Ser. No. 13/114,349, filed May 24, 2011, which is a continuation in part of U.S. patent application Ser. No. 12/912,800, filed Oct. 27, 2010. Each of these related applications are hereby incorporated by reference in their entireties.

FIELD OF THE INVENTION

The invention relates to an apparatus for helping to protect an occupant of a vehicle. More particularly, the invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated condition. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated condition. The air bag cover opens as a result of forces exerted on the cover by the inflating driver air bag.

Another type of air bag is a side impact air bag inflatable between a side structure of a vehicle and a vehicle occupant. Side impact air bags may, for example, be seat mounted, side structure mounted, or door mounted. Another type of air bag is an inflatable knee bolster inflatable between an instrument panel and/or steering column of a vehicle and a vehicle occupant. Inflatable knee bolsters may, for example, be mounted in the instrument panel or on the steering column.

Air bags may include vents for releasing inflation fluid from an inflatable volume of the bag. Airbag vents may be used to control pressurization of the air bag in response to vehicle and/or occupant conditions at the time of deployment. The air bag vents can thus help to produce a desired ride-down effect.

SUMMARY OF THE INVENTION

The invention relates to an apparatus for helping to protect an occupant of a vehicle. The apparatus includes an inflatable vehicle occupant protection device inflatable between a vehicle surface and the vehicle occupant. A vent selectively releases inflation fluid from the protection device. The vent includes a vent opening with a flow area that can be adjusted to throttle inflation fluid flow through the vent. A tether has a first connection with the vent and a second connection with the protection device. The second connection of the tether is positioned on the protection device such that deployment of the protection device throttles the vent toward an actuated condition, and occupant penetration into the protection device throttles the vent toward a non-actuated condition.

The present invention also relates to an apparatus for helping to protect an occupant of a vehicle. The apparatus includes an inflatable vehicle occupant protection device inflatable between a vehicle surface and the vehicle occupant and a vent for releasing inflation fluid from the protection device. A tether has a first connection with the vent and a second connection with the protection device. The second connection is positioned on the protection device such that a large occupant initially penetrates into the protection device at the location of the second connection and thereby throttles the vent due to displacement of the second connection upon initial penetration. A small occupant initially penetrates into the protection device below the second connection and thereby does not throttle the vent due to displacement of the second connection upon initial penetration.

The present invention further relates to an apparatus for helping to protect an occupant of a vehicle. The apparatus includes an inflatable vehicle occupant protection device that is inflatable between a vehicle surface and the vehicle occupant. A vent releases inflation fluid from the protection device. The vent includes a vent opening with a flow area that can be adjusted to throttle inflation fluid flow through the vent. A tether has a first connection with the vent and a second connection with the protection device. Tension on the tether throttles the vent. A guide is connected to the protection device, and the tether extends through the guide. The guide is positioned on the protection device to move with the protection device in response to occupant penetration into the protection device. This guide movement causes the tether to slide through the guide and thereby throttle the vent.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIGS. 3A-3C are schematic views illustrating different conditions of the apparatus;

FIGS. 6A-6C are enlarged views of a portion of the apparatus in different conditions, according to an embodiment of the invention;

FIGS. 7A-7C are enlarged views of a portion of the apparatus in different conditions, according to an embodiment of the invention;

FIG. 8 is a schematic side view illustrating an apparatus for helping to protect an occupant of a vehicle, according to another aspect of the invention;

FIGS. 9A and 9B are schematic side views illustrating an apparatus for helping to protect an occupant of a vehicle, according to another aspect and embodiment of the invention; and FIGS. 10A-10C are enlarged views of a portion of the apparatus of FIGS. 9A and 9B in different conditions.

DETAILED DESCRIPTION OF THE INVENTION

Figure 1:
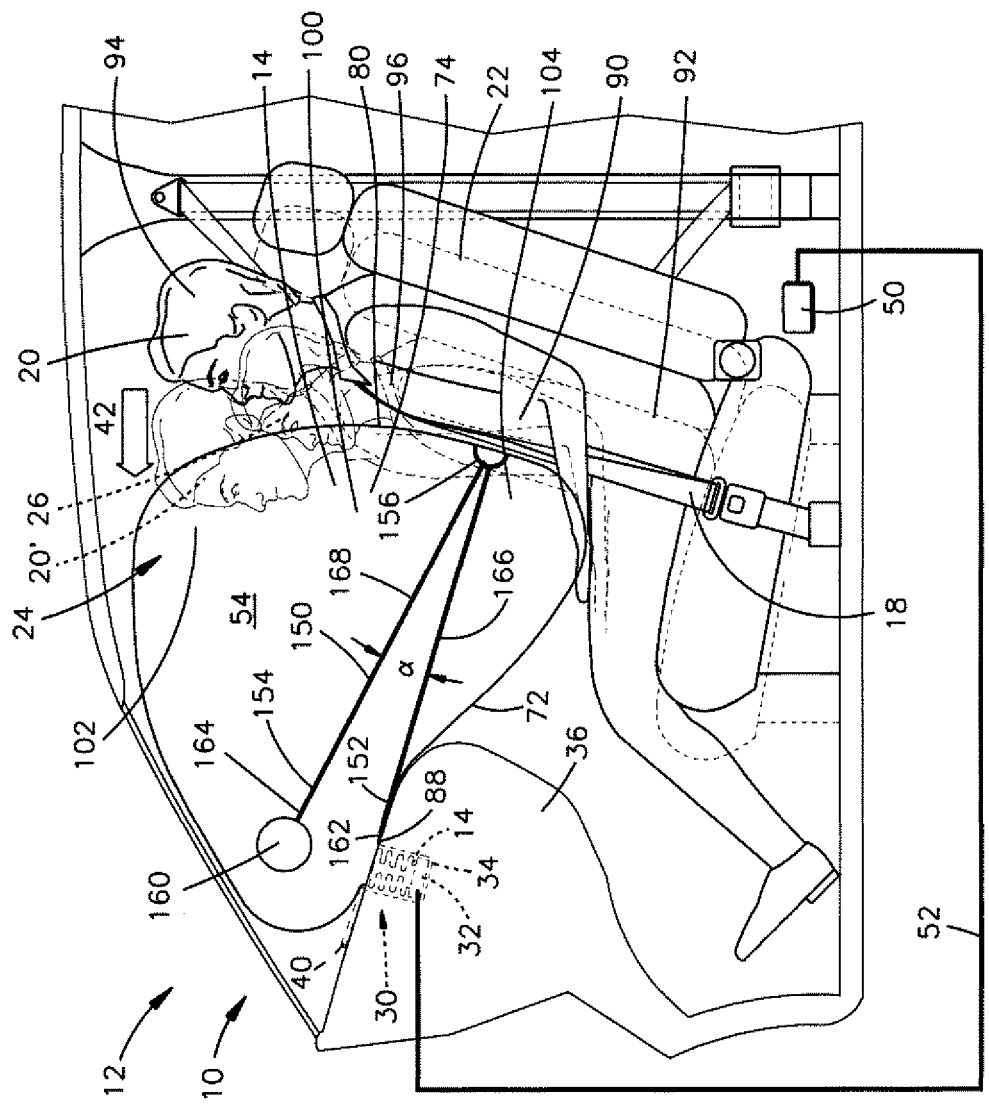
FIGS. 1 and 2 are schematic side views illustrating an apparatus for helping to protect an occupant of a vehicle, according to an aspect of the invention.
Figure 2:
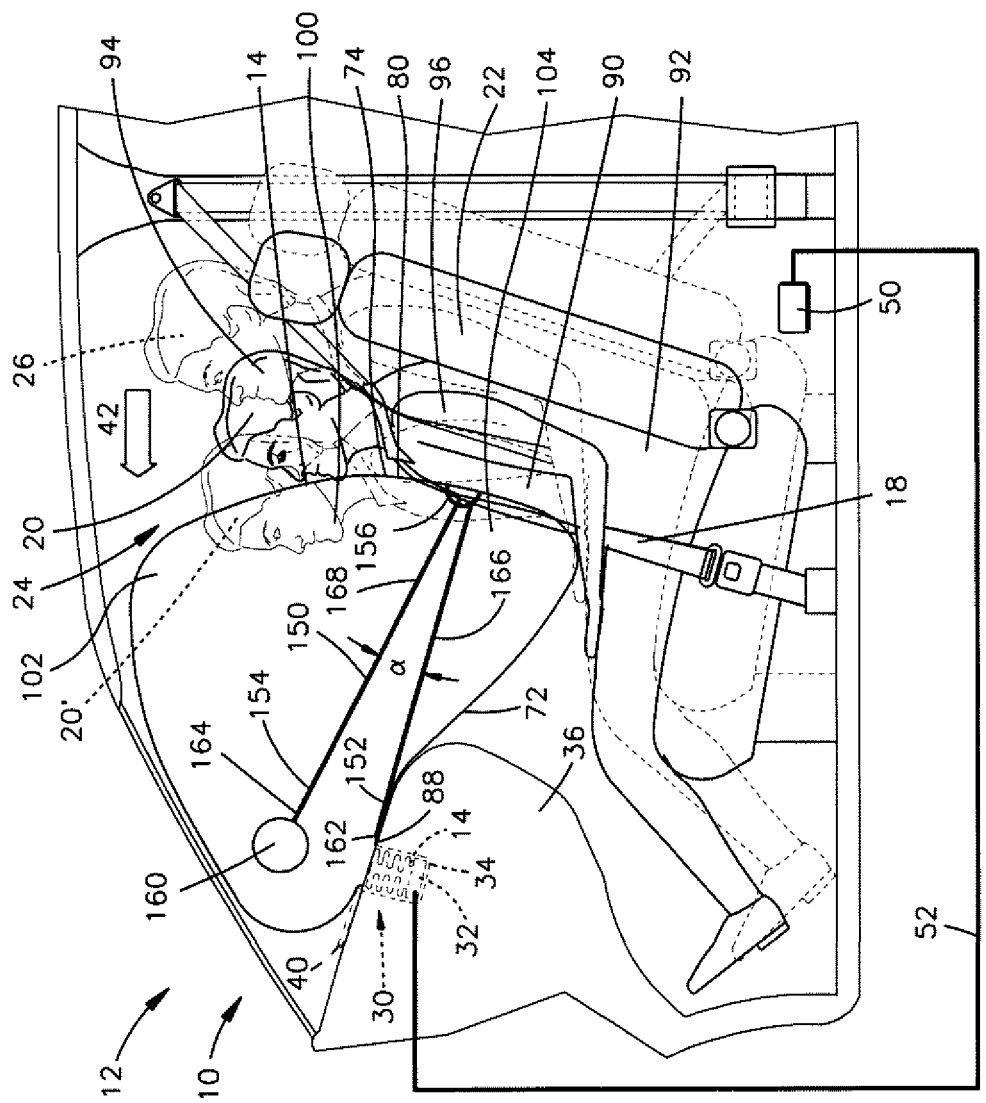

An apparatus 10 for helping to protect an occupant 20 of a vehicle 12 includes an inflatable vehicle occupant protection device 14 in the form of an air bag. In the embodiment illustrated in FIGS. 1 and 2, the air bag 14 is a passenger frontal air bag for helping to protect an occupant 20 of a seat 22 on a passenger side 24 of the vehicle 12. As shown in FIGS. 1 and 2, the vehicle 12 also includes a seatbelt 18 for helping to protect the vehicle occupant 20.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated, deployed, and pressurized condition illustrated in solid lines in FIG. 1. The air bag 14, while inflated, helps protect the vehicle occupant 20 from impacts with parts of the vehicle 12, such as the instrument panel 36 and/or steering wheel (not shown).

The air bag 14, when deployed in response to an event for which occupant protection is desired, helps protect the occupant 20 by helping to absorb the force of impact placed on the air bag by the occupant. When the occupant 20 impacts the air bag 14, the occupant penetrates into the air bag, which absorbs and distributes the impact forces throughout the large area and volume of the bag. By "penetrates" into the air bag 14, it is meant to refer to the instance where, in the case of a frontal impact to the vehicle 12, the occupant is moved forward, as indicated by the arrow labeled 42 in FIGS. 1 and 2, into engagement with the air bag 14.

The "penetration" of the occupant into the air bag 14 is the distance or degree to which the occupant 20 moves into the inflated depth of the air bag. In other words, the degree of penetration could be measured as the distance the penetrating occupant 20 moves a given point on a front panel 74 of the air bag 14 toward the instrument panel 36. For example, penetration could be measured as the distance between a point on the front panel 74 and a fixed point on the instrument panel 36 or between a point on the occupant 20 (e.g., the occupant's chest) and a fixed point on the instrument panel.

Several factors determine the degree to which an occupant 14 penetrates the air bag 14. For example, the size or mass of the occupant 20, the speed at which the occupant strikes the air bag 14, the pressurization of the air bag, the seat position (forward/rearward, upright/reclined), and whether or not the occupant is restrained by the seatbelt 18 all help determine the degree to which the occupant penetrates the air bag in a given deployment scenario. Some of these determining factors are illustrated in FIG. 4, which depicts chest to instrument panel air bag penetration for occupants that are different in size, that are belted versus unbelted, and that strike the air bag 14 at different speeds.

Figure 4:
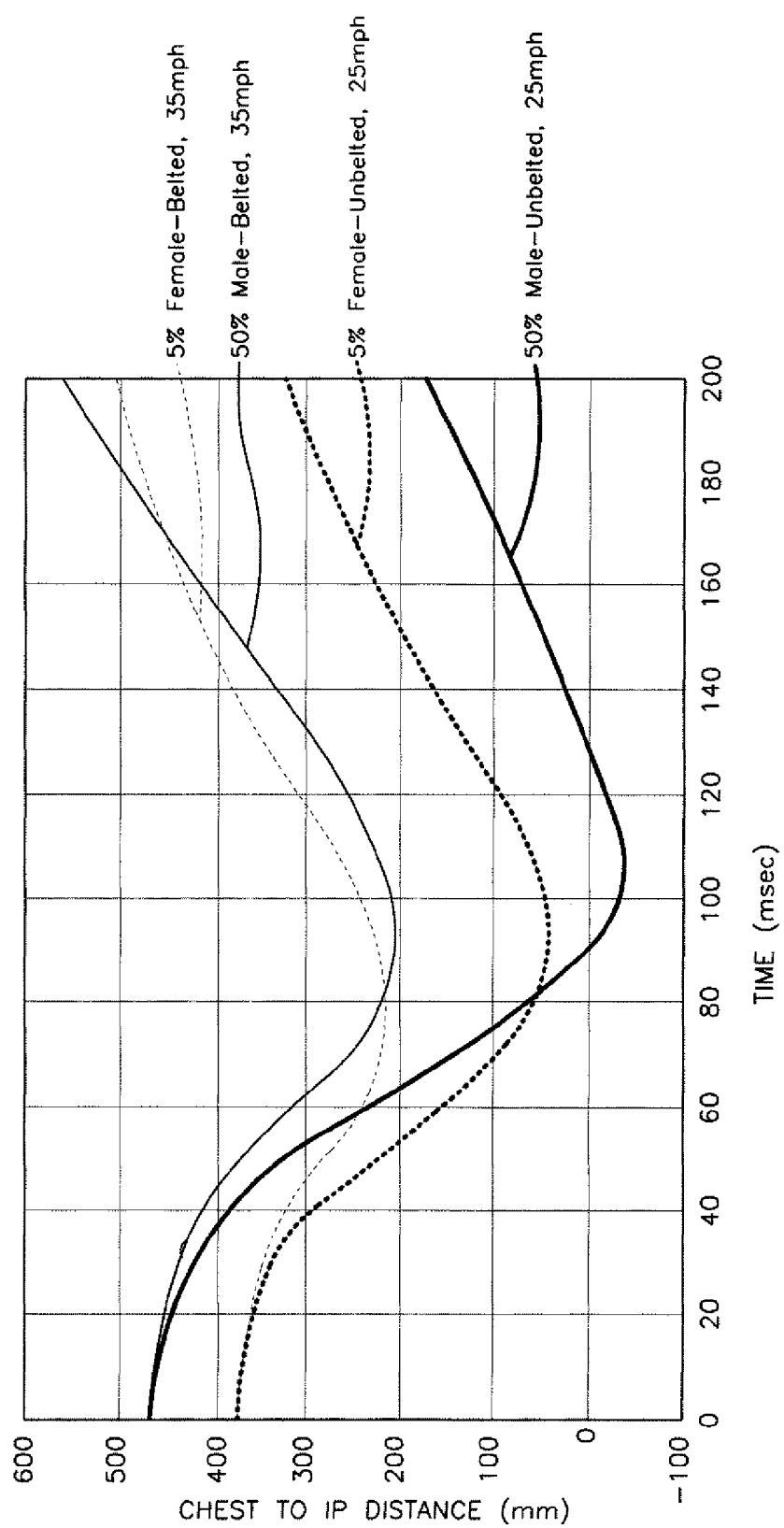
FIG. 4 is a chart illustrating certain occupant characteristics under different vehicle operating conditions.

FIG. 4 illustrates penetration values for two differently sized occupants—a $50^{th}$ percentile male occupant (50% male) and a $5^{th}$ percentile female occupant (5% female). The 50% male is derived from statistical values for the U.S. male population. The 50% male has the mean height and weight of the male U.S. population, meaning that roughly half of the U.S. male population is taller/heavier and roughly half of the U.S. male population is shorter/lighter. The 50% male is thus an average or medium sized male occupant, and thus would typically adjust his vehicle seat to a middle position, especially when driving the vehicle. The 5% female is derived from statistical values for the U.S. female population. The 5% female has a mean height and weight that, is taller/heavier than only roughly 5% of the U.S. female population. Conversely, this means that roughly 95% U.S. female population is taller/heavier than the 5% female. The 5% female is thus a small female occupant, and thus would typically adjust her vehicle seat to a forward position, especially when driving the vehicle.

FIG. 4 illustrates that whether the occupant is belted versus unbelted has an effect on occupant penetration into the air bag. In the tests used to produce the data shown in FIG. 4, the seat position of the 5% female is set about 200 mm forward of the seat position of the 50% male. As shown in FIG. 4, an unbelted 5% female occupant travelling at 25 mph penetrates the air bag over approximately 150 mm more than a belted 5% female occupant traveling at 35 mph. Similarly, an unbelted 50% male occupant travelling at 25 mph penetrates the air bag well over 200 mm more (approximately 225 mm) than a belted 50% male occupant traveling at 35 mph. In fact, the unbelted 5% female traveling at 25 mph penetrates the air bag approximately 150 mm more than the belted 50% male occupant traveling at 35 mph.

Those skilled in the art will appreciate that much can be extrapolated from belted/unbelted data illustrated in FIG. 4. For example, a 50% 25 mph unbelted male will strike through the air bag and impact the instrument panel. A 5% 25 mph unbelted female will come within 50 mm of striking through the air bag and impacting the instrument panel. Due to the differing seat positions for the occupants, belted 50% mate and 5% females travelling at 35 mph will come within about 200 mm of striking through the air bag and impacting the instrument panel. It will thus be appreciated that the difference between striking through and cushioning can be a matter of relatively short distances/positions. For example, if the seat position of the 50% male is 100 mm closer, the difference between strikethrough and non-strikethrough is 100 mm, which can easily be taken up if the occupant is somewhat taller or heavier, if the seatbelt is somewhat loose, or if the vehicle is travelling at a somewhat higher rate of speed. It thus becomes very difficult to respond actively to the vast number of combinations of occupant size/weight, seat position, vehicle speed, and buckle conditions that may be present at the time of air bag deployment.

To account for this, according to the invention, the air bag 14 may have one or more actuatable features for helping to control or tailor inflation, deployment, and pressurization of the air bag in response to vehicle conditions, occupant conditions, or both vehicle and occupant conditions. According to the invention, these features are actuatable passively in response to vehicle and occupant conditions at the time of inflation. Thus, in the illustrated embodiment, these features are actuatable without relying on active sensors and/or actuators, such as electrical or pyrotechnic actuators.

Referring to FIGS. 1 and 2, the air bag 14 includes a tether 150 for actuating a vent 160 for releasing inflation fluid from the inflatable volume 54 of the air bag 14. The tether 150 is adapted to actuate the vent 160 depending on vehicle or occupant conditions in the vehicle 12 both at the time of deployment and during air bag 14 deployment. In the embodiment of FIGS. 1 and 2, the adaptive tether 150 comprises a single length of tether material that has a first connection 162 connecting a first end portion 152 of the tether. The first connection 162 may, for example, connect the first end portion 152 of the tether 150 to a rear panel 72 of the air bag 14 or to a portion of the air bag module 30, such as the housing 34. The tether 150 has a second connection 164 connecting a second end portion 154 of the tether. The second connection 164 may, for example, connect the second end portion 154 of the tether 150 to the vent 160.

The tether 150 extends through a guide 156 that is connected to the air bag 14. In the embodiment of FIGS. 1 and 2, the guide 156 is mounted on a front panel 74 of the air bag 14. The guide 156 anchors the tether 150 to the air bag and permits the tether 150 to slide or otherwise move through its structure. The guide 156 divides the tether 150 into a first segment 166 and a second segment 168.

Figure 5:
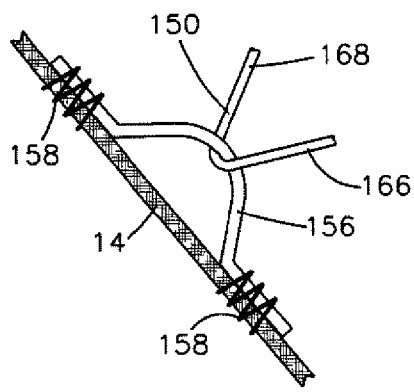
FIG. 5 is an enlarged view of a portion of the apparatus.

The guide 156 may take various forms. Referring to FIG. 5, the guide 156 may, for example, comprise a piece or loop of material, such as air bag fabric, that is secured to a panel of the air bag 14 by means such as stitching 158. Alternative means for connecting the guide 156 to the air bag 14 include ultrasonic welding, adhesives, and heat bonding, and mechanical fasteners. The guide 156 may have alternative constructions and/or configurations. For example, instead of a piece or loop of material, the guide 156 may have a metal or plastic construction. Guides having this construction may, for instance, be in the form of a metal/plastic D-ring or a metal/plastic eyelet or grommet reinforcing a hole or aperture in a fabric material. As another example, the guide 156 may be configured as a part of the air bag housing 34, in which case the guide may comprise a ring or aperture formed in or connected to the housing structure.

According to the invention, the adaptive tether 150 functions in cooperation with the guide 156 to be responsive to vehicle conditions, occupant conditions, or both vehicle conditions and occupant conditions to control actuation of the vent 160. Particularly, the tether 150 throttles the vent 160 to help adapt may adapt the inflation, deployment, configuration, shape, pressurization, or a combination thereof, of the air bag 14. According to the embodiment of FIGS. 1 and 2, this control is implemented passively through the physical construction and configuration of the air bag 14 and the adaptive tether 150, the guide 156, and the vent 160.

In particular, in the embodiment of FIGS. 1 and 2, the air bag 14, adaptive tether 150, guide 156, and vent 160 are constructed, configured, and arranged to throttle the vent and thereby adapt the inflation, deployment, and pressurization of the air bag 14 depending on the penetration of the occupant into the air bag 14. This is beneficial because vehicle/occupant conditions, such as the occupant size/weight, whether the occupant is belted or unbelted, the occupant's seat position (forward/rearward, upright/reclined), and the vehicle speed all affect the degree of occupant penetration into the air bag. By adapting the air bag 14 passively in response to occupant penetration, there is no need for an active determination of all of these factors because all of these factors are accounted for inherently and automatically through the configuration and construction of the air bag.

In describing the function of the vent 160, the terms "actuated," "non-actuated," and "throttled" are used to identify different conditions of the vent. The actuated condition of the vent 160 refers to the condition of the vent when the tether 150 is fully tensioned due, for example, to full or substantially full deployment of the air bag 14. The non-actuated condition of the vent 160 refers to the condition of the vent when the tether has not been tensioned due to air bag deployment to an extent sufficient to cause any change in inflation fluid flow through the vent. The throttled condition of the vent 160 refers to the condition of the vent where air bag displacement has been blocked, e.g., due to an out-of-position occupant or due to an occupant penetrating into the air bag, such that inflation fluid flow through the valve is altered.

FIG. 1 illustrates (in solid lines) an occupant 20, such as a 50% male, in a normally seated and belted condition with the vehicle seat 22 in an upright mid-positioned (i.e., between full rear and full forward) condition. As shown in FIG. 1, in the illustrated case of a belted 50% male occupant 20, the seatbelt 18 serves to help restrain the occupant 20. As a result, the belted occupant 20, especially the occupant's lower torso 90 and hips 92 are restrained from moving toward the instrument panel 36. This allows the air bag 14 to inflate and deploy with comparatively little resistance or inhibition from the occupant 20 to a fully inflated and deployed condition. The tether 150 is thus tensioned and places the vent 160 in its actuated condition. In FIG. 1, as shown generally at 20', the belted occupant's head 94 and upper torso 96 may be somewhat less restrained and may bend forward, penetrating somewhat into a middle portion 100 or upper portion 102 of the air bag 14.

The guide 156, being connected to the front panel 70 at a location adjacent the mid/lower torso 90, does not move significantly in response to this upper body penetration of the mid-positioned belted 50% male occupant 20. As shown in FIG. 1, however, the degree or distance to which the occupant 20' penetrates into the air bag 14 may be comparatively or relatively small. If circumstances, such as the severity of the event, the tightness of the seatbelt 18, or the position of the occupant 20 at the time the event occurs, result in further penetration of the occupant, the guide 156 may move toward the instrument panel 36 and the vent 160 may be throttled. Otherwise, the vent 160 may remain in its (fully) actuated condition and the air bag 14 is left to provide its intended cushioning and ride down effect.

In the illustration of FIG. 1, the mid/lower torso 90 and hips 92 of the occupant 20 do not penetrate significantly into the lower portion 104 of the air bag 14. In the embodiment illustrated in FIG. 1, the lower portion 104 is the location where the guide 156 is located. Therefore, in the case of the 50% male occupant illustrated in FIG. 1, the lower portion 104 and the guide 156 fully deploy and the tether 150 becomes tensioned, and the tensioned tether 150 actuates the vent 160. This can be compared to the small occupant, such as a 5% female, which is shown in dashed lines at 20".

FIG. 2 illustrates (in solid lines) an occupant 20, such as a 5% female, in a normally seated and belted condition with the vehicle seat 22 in an upright forward positioned condition. The conditions in FIG. 2 are identical to those of FIG. 1, except the occupant is smaller and the seat is in the forward position. In FIG. 2, the seatbelt 18 serves to help restrain the occupant 20, restraining the occupants lower torso 90 and hips 92 are from moving toward the instrument panel 36. As shown in dashed lines at 20', similar to FIG. 1, the belted 5% female occupant's head 94 and upper torso 96 may be somewhat less restrained and may bend forward, penetrating into a middle portion 100 or upper portion 102 of the air bag 14.

As shown in FIG. 2, however, the forward position of the vehicle seat 22 can make a significant difference in the deployment of the air bag 14. The forward position of the vehicle seat 22 positions the occupant 20 closer to the instrument panel 36 such that the occupant blocks the air bag 14 from reaching the fully inflated and deployed position. Therefore, other conditions being equal, the 5% female occupant of FIG. 2 can experience penetration to a comparatively greater extent than the 50% male occupant (shown in dashed lines at 26). As a result, in the case of the 5% female occupant illustrated in FIG. 2, the lower portion 104 of the air bag 14 and the guide 156 are blocked from reaching full deployment and the tether 150 therefore does not fully actuate the vent 160. The vent 160 is thus throttled passively in accordance with the vehicle and occupant conditions that position the occupant 20 as shown in FIG. 2.

Those skilled in the art will appreciate that the difference in the fore/aft seat position between the 50% male in FIG. 1 and the 5% female in FIG. 2 may not be large. The difference may, for example, be as little as 50 mm. Since, however, it is the small, forward positioned 5% female (FIG. 2) that penetrates further into the air bag 14, it is desirable to ensure that the vent 160 is throttled effectively and reliably. It is equally desirable that the vent 160 throttles differently in the case of the large mid/rear positioned 50% male occupant (FIG. 1) that does not penetrate significantly into the air bag 14. This can be difficult, given the small difference in the positions of the two occupants.

According to the invention, the combination of the guide 156 and tether 150 allow not only for throttling the vent 160, but also for adjusting the sensitivity of the throttling. The vent 160 of the invention has an open condition (e.g., full-open), a closed condition (e.g., full-closed), and conditions between these two extremes in which the vent is partially opened/closed. "Throttling" as used herein is meant to refer to the fact that the degree to which the tether 150, being configured for displacement and/or tension adjustments in response to occupant penetration, correspondingly controls, i.e., throttles, the degree to which the vent is opened/closed. As the vent 160 moves between the full open and full closed condition and vice versa, the degree to which the vent is actuated (i.e., % opened or % closed) changes.

"Throttling sensitivity" as used herein is meant to the degree or rate at which the vent 160 is throttled in response to a given change in displacement/tension of the tether 150. As described above, displacement of the tether 150 corresponds on the degree of penetration into the air bag 14 where the guide 156 is connected. Thus, a tether 150 and vent 160 configuration with comparatively high throttling sensitivity would produce a comparatively large change in vent throttling in response to a given change in tether displacement/tension. Similarly, a tether 150 and vent 160 configuration with comparatively low throttling sensitivity would produce a comparatively small change in vent throttling in response to the same given change in tether displacement/tension. In this description, the throttling sensitivity is quantified as a ratio of tether displacement to air bag penetration distance ($D_T$:$D_P$).

In the embodiment shown in FIGS. 1 and 2, the tether 150 and guide 156 are configured such that the first and second segments 166 and 168 extend at a small acute angle (tether angle α) relative to each other. If the segments 166 and 168 were configured to extend parallel to each other, it would be easy to recognize that occupant penetration into the air bag 14 that results in movement of the guide 156 of X millimeters toward the instrument panel 36 would produce a corresponding change in tether 150 displacement of 2× millimeters. Thus, according to the invention, the tether 150 and guide 156 are configured to produce a comparatively high throttling sensitivity, approaching 2:1 ($D_T$:$D_P$). This high throttling sensitivity allows for throttling the vent 160 in a manner that is highly sensitive and responsive to differing air bag penetrations. Thus, referring to the embodiment illustrated in FIGS. 1 and 2, this allows the tether 150 and guide 156 to differentiate and respond to the 50% male and 5% female differently even though the difference in positioning may be slight.

According to the invention, the throttling sensitivity of the tether 150 and vent 160 configuration can be adjusted by changing or adjusting the angle α at which the tether extends from the guide 156. In the single guide configuration of FIGS. 1 and 2, the sensitivity is maximized by configuring the tether segments 166 and 168 as close to parallel as possible, thus producing a throttling sensitivity that approaches 2:1 ($D_T$:$D_P$). To decrease the throttling sensitivity, the tether 150 and vent 160 combination are adjusted/configured so that the angle α is increased. As the angle α increases, the throttling sensitivity decreases, and the degree to which the tether 150 throttles the vent 160 for a given occupant penetration decreases.

In the embodiments of FIGS. 1 and 2, it should be noted that the tether 150 remains tensioned even though, in FIG. 2, the occupant 20 penetrates the air bag 14 and moves the guide 156. This is because the vent 160 itself takes up the tether 150 as the occupant 20 penetrates the air bag 14 and the vent is throttled between the fully open and fully closed position. This is illustrated in FIGS. 3A-3C.

Referring to FIG. 3A, When the air bag 14 is fully inflated and deployed, the tether 150 becomes fully tensioned and fully actuates the vent 160. The vent 160 is configured such that an actuatable vent part (not shown in FIGS. 3A-3C) that controls fluid flow through the vent is urged to move in response to inflation fluid pressure in the air bag 14. Inflation fluid pressure in the air bag 14 urges the vent 160 toward the non-actuated condition. The tether 150 is configured to such that tension on the tether urges the actuatable vent part toward the actuated condition against inflation fluid pressure in the air bag 14. Thus, when the air bag 14 is fully inflated and deployed, the tether 150 overcomes the urging that inflation fluid pressure places on the vent member and places the vent 160 in the fully actuated condition. When the vent 160 is throttled due to occupant penetration, the tether 150 is tensioned between the front panel 74 (FIGS. 1 and 2) of the air bag 14, the anchor point 162, and the vent 160.

Referring to FIG. 3B, as the occupant 20 penetrates the air bag 14 and begins displacing the guide 156, the tether 150 is displaced and the actuatable vent member is permitted to move in response to fluid pressure in the air bag 14, thus throttling the vent 160. As the vent 160 throttles between the actuated and non-actuated conditions, the tension on the tether 150 is maintained. As the degree of occupant penetration increases, the throttling of the vent 160 adjusts accordingly.

Referring to FIG. 3C, once the occupant 20 penetrates the air bag 14 to a degree such that the vent 160 is throttled to the non-actuated condition, tension on the tether 150 is released. At this point, since the vent 160 is in the non-actuated condition, further penetration does not affect the vent. If, for some reason, the occupant 20 moves in a direction that reverses the penetration, and inflation fluid pressure in the air bag 14 is still sufficient, the tether 150 could again become tensioned and vent 160 throttling could resume.

The vent 160 may be configured such that the actuated condition of the vent is either an open condition or a closed condition. In this description, an "actuated open" vent is closed at the time of deployment, and unrestricted air bag deployment tensions the tether and actuates the vent (substantially or fully) opened. Occupant penetration into the protection device throttles the vent back towards the closed condition. Additionally, in this description, an "actuated closed" vent is open at the time of deployment, and unrestricted air bag deployment tensions the tether and actuates the vent (substantially or fully) closed. Occupant penetration into the protection device throttles the vent back towards the open condition. Those skilled in the art will appreciate that the selection of a actuated open or actuated closed vent configuration can be based on a variety of factors, such as the position of the air bag (driver frontal/passenger frontal) and the desired cushioning and ride down characteristics.

Figure 6A:
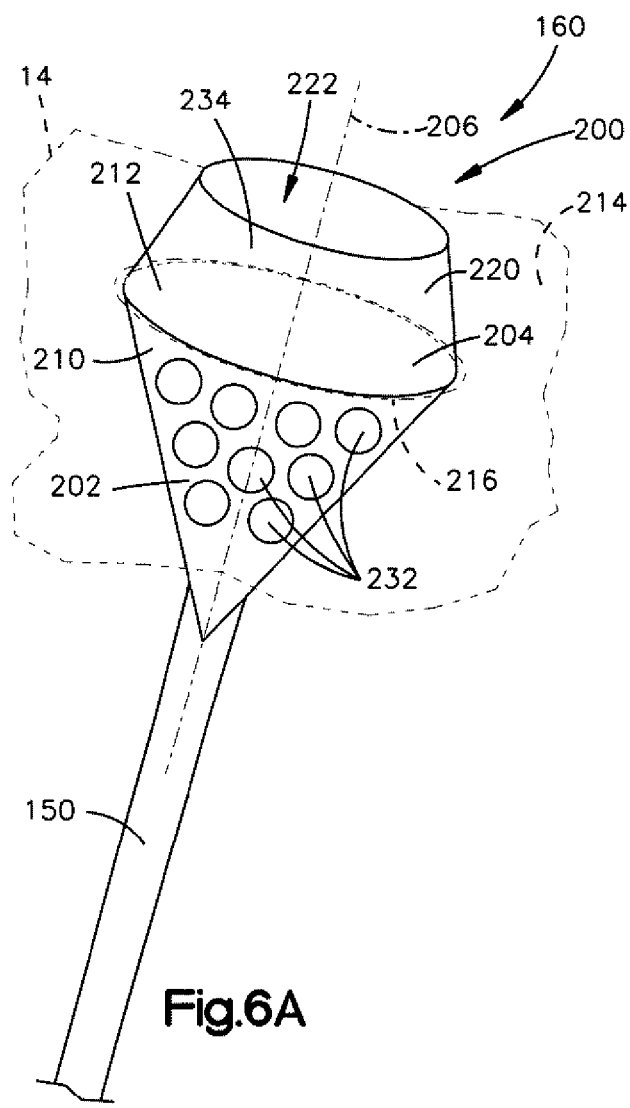
Figure 7C:
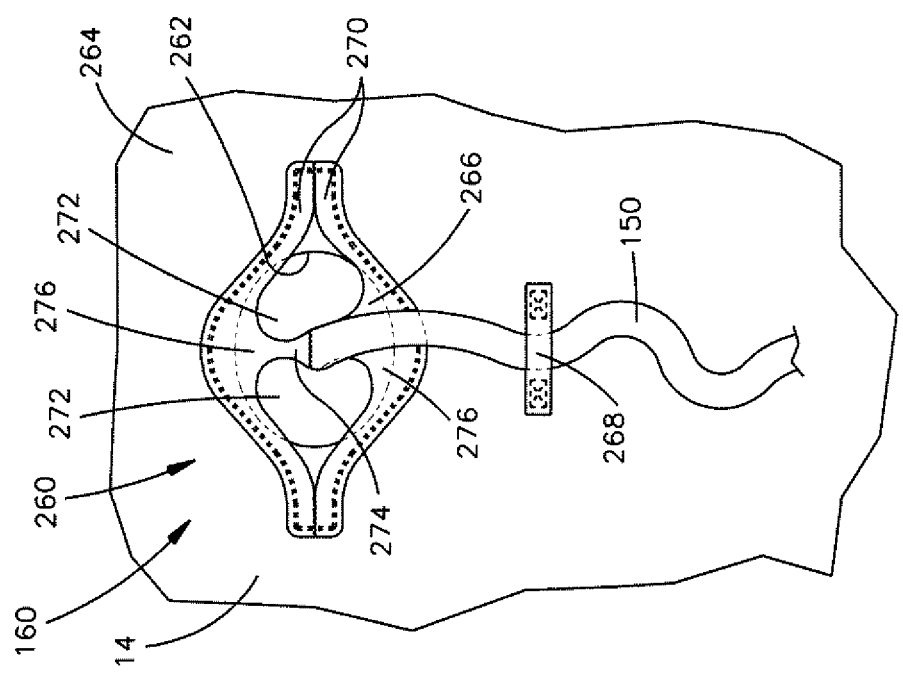

According to the invention, the vent 160 may have any actuated open or actuated closed configuration that is capable of performing with the tether 150 to provide throttled venting in accordance with the description set forth above. For purposes of illustration, an example of an actuated open vent is illustrated in FIGS. 6A-6C and an example of an actuated closed vent is illustrated in FIGS. 7A-7C. The actuated, non-actuated, and throttled conditions of the vents of FIGS. 6A-6C and 7A-7C correspond to the vehicle and occupant conditions illustrated in FIGS. 3A-3C according to table 1:

TABLE 1

| Vent Condition | Actuated Open Vent FIGS. 6A-6C | Actuated Closed Vent FIGS. 7A-7C | Corresponding FIG. |
|---|---|---|---|
| Actuated | Open | Closed | FIG. 3A |
| Throttled | In Between | In Between | FIG. 3B |
| Non-Actuated | Closed | Open | FIG. 3C |

Referring to FIGS. 6A-6C, the vent 160 is an actuated open vent 200 that is actuatable to release inflation fluid from the air bag 14. In this embodiment, inflation fluid pressure in the air bag 14 acts to place/maintain the vent 200 in the open condition at the time of deployment. The structure of the actuated open vent 200 is illustrated schematically in FIGS. 6A-6C. The vent 200 has a generally conical configuration forming a conduit that extends through an opening 216 in a wall 214 of the air bag 14. The opening 216 has a shape that mates with the cross-sectional shape of the vent 200 at its interface with the wall 214. Thus, in the embodiment of FIGS. 6A-6C, the opening 216 in the air bag wall 214 is circular.

Referring to FIGS. 6A-6C, the vent 200 comprises a first portion comprising a conical inner wall 202 and a second portion comprising a frusto-conical outer wall 204. The inner and outer walls 202 and 204 share a common central axis 206. As shown in FIGS. 6A-6C, respective base portions 210 and 212 of the inner and outer walls 202 and 204 meet each other at the air bag wall 214, where they are connected to the air bag 14 about the periphery of the opening 216 in the wall 214. As shown in FIGS. 6A-6C, the inner and outer walls 202 and 204 may have congruent or substantially congruent configurations in which their respective base portions 210 and 212 have equal or substantially equal diameters, and the respective walls extend at equal or substantially equal angles with respect to the common axis 206.

The inner wall 202 tapers down from the base portion 210 and extends away from the air bag wall 214 into the inflatable volume of the air bag 14. The outer wall 204 tapers down from the base portion 212 and extends away from the air bag wall 214 and away from the air bag 14 outside the inflatable volume of the air bag 14. The frusto-conical outer wall 204 has an open end portion 220 that defines an outlet 222 of the vent 200. The outer wall 204 defines a passage or discharge chamber 234 through which inflation fluid may travel en route to the outlet 222. The inner wall 202 has a closed end portion 224 to which a first end portion of a tether 150 is connected. The inner wall 202 thus acts as an actuatable vent member. The inner wall 202 includes a plurality of vent openings 232 spaced about the circumference of the inner wall. In the embodiment illustrated in FIGS. 6A-6C, the openings 232 have a generally circular shape. The openings 232 could, however, have alternative configurations. For example, the openings could comprise elongated slots, X-shaped slits, cross-shaped slits, T-shaped slits, Y-shaped slits, or other suitably shaped openings.

The actuated open vent 200 has an actuated open condition illustrated in FIG. 6A, a throttled intermediate condition illustrated in FIG. 6B, and a non-actuated closed condition illustrated in FIG. 6C. In the actuated open condition of FIG. 6A, the tether 150 actuates the vent 200, tensioning or otherwise pulling/maintaining the inner wall 202 in an open condition positioned at least partially within the inflatable volume 54 of the air bag 14. The tensioned tether 150 acts against inflation fluid pressure in the air bag 14, which urges the inner wall outward toward the closed condition of FIG. 6C. The tether 150 is fully tensioned and is not displaced by a penetrating occupant. The condition of the vent 200 illustrated in FIG. 6A thus corresponds to the fully inflated and deployed condition illustrated in FIG. 3A and described in reference to FIGS. 3A-3C. In this condition, the tether 150 substantially or completely prevents the inner wall 202 from entering the discharge chamber 234. In the open condition, fluid communication is established between the inflatable volume 54 and the atmosphere surrounding the air bag 14 via the vent openings 232, the discharge chamber 234, and the outlet 222.

In the throttled condition of FIG. 6B, tension on the tether 150 is maintained but, due to a penetrating occupant, the air bag 14 has not reached the fully inflated and deployed condition. The condition of the vent 200 illustrated in FIG. 6B thus corresponds to the partial occupant penetration condition illustrated in FIG. 3B and described in reference to FIGS. 3A-3C. In this condition, the inner wall 202 is placed in a throttled condition in which the inner wall is partially inverted into the discharge chamber 234, blocking a portion of the vent openings 232 (shown in dashed lines) and leaving open the remaining vent openings (shown in solid lines). The vent 200 thus throttles inflation fluid flow through the partially blocked/partially unblocked openings 232. The pressure of inflation fluid in the air bag 14 presses the inner wall 202 against the blocked openings 232 and thereby forms an effective seal for blocking flow through those openings.

In the closed condition of FIG. 6C, the tether 150 does not tension or otherwise pull/maintain the inner wall 202 in the open condition positioned within the inflatable volume 54 of the air bag 14. The non-actuated condition of the vent 200 illustrated in FIG. 6C thus corresponds to the high occupant penetration condition illustrated in FIG. 3C and described in reference to FIGS. 3A-3C. The inner wall 202 is thus free to move in response to inflation fluid pressure in the inflatable volume 54 of the air bag 14. Under the pressure of inflation fluid in the inflatable volume 54, the inner wall 202 moves to a closed condition positioned at least partially within the discharge chamber 234 defined by the outer wall 204. In the closed condition, the inner wall 202 is inverted from the open condition. Since the inner wall 202 and outer wall 204 have congruent or substantially congruent configurations, the inner wall 202 when in the closed condition mates with, overlies, and follows the contour of the outer wall 204, thereby forming a tight and close fit between the walls. Inflation fluid pressure in the air bag 14 maintains this fit and the resulting seal that blocks inflation fluid flow through the openings 232.

According to the invention, in the closed condition of the vent 200, the vent openings 232 are positioned against corresponding portions of the outer wall 204. Since the conical inner wall 202 is closed at the end portion 224, the inflation fluid pressure in the air bag presses the portions of the inner wall 202 surrounding the vent openings 232 against the corresponding portions of the outer wall 204. As a result, the outer wall 204 constrains the inner wall 202 and blocks or substantially blocks fluid communication between the inflatable volume and the atmosphere surrounding the air bag 14. Inflation fluid venting is thus blocked in the non-actuated, closed condition of the vent 200.

Referring to FIGS. 7A-7C, the vent 160 is an actuated closed vent 260 that is actuatable to retain inflation fluid in the air bag 14. In this embodiment, inflation fluid pressure in the air bag 14 acts to place/maintain the vent 260 in the closed condition at the time of deployment. The structure of the actuated closed vent 260 is illustrated schematically in FIGS. 7A-7C. The vent 260 includes one or more vent openings 262 formed in a panel 264, such as a side panel, of the air bag 14. A vent door 266 is secured to the side panel 264 and covers the openings 262. The tether 150 has a first end portion secured to the vent door 266, and extends through a guide 268 that is secured to the air bag panel 264. The vent door 266 thus acts as an actuatable vent member.

The vent door 266 is secured to the panel 264 by known means, such as stitching, ultrasonic welding, heat bonding, or adhesives. In the illustrated embodiment, the vent door 266 itself includes separate panels 270 of material that are secured to each other by known means, such as stitching, to give the vent door the illustrated configuration. Those skilled in the art will appreciate that the vent door 266 could have alternative single panel or multiple panel constructions.

The vent door 266 has one or more vent openings 272 formed therein. In the embodiment illustrated in FIGS. 7A-7C, the vent door 266 includes two vent openings 272. The tether 150 is secured to a strip 274 of material of the vent door 266 that is positioned between the vent openings 272. The strip 274 interconnects opposing cover flaps 276 of the vent door 266.

The actuated closed vent 260 has an actuated closed condition illustrated in FIG. 7A, a throttled intermediate condition illustrated in FIG. 76, and a non-actuated open condition illustrated in FIG. 7C. In the closed condition of FIG. 7A, the vent 260 has a closed condition in which the tether 150 is tensioned and not displaced by a penetrating occupant. The condition of the vent 260 illustrated in FIG. 7A thus corresponds to the fully inflated and deployed condition illustrated in FIG. 3A and described in reference to FIGS. 3A-3C. In the closed condition of FIG. 7A, the tensioned tether 150 is forced by the guide 268 to extend along the air bag panel 264. In this condition, the cover flap portions 276 of the vent door 266 are tensioned along the air bag panel 264. The shape and size of the cover flap portions 276 are configured such that, when tensioned along the air bag panel 264, they both close the vent openings 272 of the vent door 266 and cover the opening 262 in the air bag panel 264. In the closed condition of the vent 260, the vent door 266 thus blocks inflation fluid from exiting the air bag 14.

In the intermediate throttled condition of FIG. 7B, the tether 150 is tensioned, but somewhat displaced by a penetrating occupant. The condition of the vent 260 illustrated in FIG. 7B thus corresponds to the partial occupant penetration condition illustrated in FIG. 3B and described in reference to FIGS. 3A-3C. In the throttled condition of FIG. 7B, the tensioned tether 150 is forced by the guide 268 to extend along the air bag panel 264. In this condition, the displacement of the tether 150 caused by the partial penetration of the occupant permits the cover flap portions 276 of the vent door 266 to bulge outward partially and assume a somewhat convex configuration. This allows the cover flap portions 276 of the vent door 266 to partially open the vent openings 272 under the pressure of inflation fluid in the air bag 14. Thus, in the throttled condition of FIG. 7B, the vent 260 vents inflation fluid at a reduced, i.e., throttled, flow rate.

In the open condition of FIG. 7C, due to displacement by a penetrating occupant, the tether 150 is not tensioned. The condition of the vent 260 illustrated in FIG. 7C thus corresponds to the high occupant penetration condition illustrated in FIG. 3C and described in reference to FIGS. 3A-3C. In the opened condition of FIG. 7C, the tether 150 is relaxed or slacked, thereby permitting the cover flap portions 276 of the vent door 266 to bulge outward fully and assume a convex configuration. In this condition, the vent openings 272 are opened due to the pressure of inflation fluid in the air bag 14 and thereby release inflation fluid from the air bag 14 through the openings 262 and 272.

Referring to FIG. 8, the throttling sensitivity of the vent can be adjusted or otherwise tailored through the configuration of the tether, through the inclusion of multiple guides, or through a combination of tether and guide configurations. In the example of FIG. 8, the air bag 14a includes a vent 160a and a tether 150a for actuating and throttling the vent in the manner described herein. The vent 160a may be an actuated open vent (see, e.g., FIGS. 6A-6C) or an actuated closed vent (see, e.g., FIGS. 7A-7C).

As shown in FIG. 8, the apparatus 10a includes a guide 156a that may be similar or identical in configuration and placement as that shown in the embodiment of FIGS. 1 and 2. In the embodiment of FIG. 8, the apparatus 10a includes an additional guide 300 that is associated with the vent 160a. The tether 150a has a first end portion 152a with a first connection 162a that is similar or identical to that described in the embodiments of FIGS. 1 and 2. An opposite second end 302 of the tether 150a is connected to the air bag 14a at a second connection 304. The second connection 304 may be at an upper portion 102a of the air bag 14a. The inclusion of the second guide 300 produces three tether segments 310, 312, and 314.

The configuration of FIG. 8 illustrates the configurability of the throttling sensitivity of the tether 150a. The addition of the second guide 300 increases the throttling sensitivity, i.e., ratio of tether displacement to air bag penetration distance ($D_T$:$D_P$). This is because the tether now has three segments 310, 312, and 314 that may adjust in response to air bag penetration.

Additionally, since there are three tether segments 310, 312, and 314, the throttling sensitivity can be adjusted by adjusting the angle between the segments. Adjustments to the tether angle α between the first and second segments 310 and 312 are illustrated generally at a' and a". Adjustments to the tether angle γ between the second and third segments 312 and 314 are illustrated generally at γ' and γ". As described previously, increasing the angles α and/or γ decreases the throttling sensitivity of the tether 150a. Conversely, decreasing the angles α and/or γ increases the throttling sensitivity of the tether 150a.

Furthermore, the configuration of FIG. 8 illustrates an additional aspect of the invention with regard to the throttling sensitivity of the tether. In the embodiment of FIG. 8, the tether 150a, being connected by the guide 156a to the lower portion 104a of the air bag 14a and by the connection 304 to the upper portion 102a, is capable of reacting to occupant penetration at two different locations on the air bag. Thus, the apparatus 10a can have different throttling sensitivities depending on the location at which the occupant 20a penetrates the air bag 14a.

For example, the occupant 20a may penetrate only the upper portion 102a of the air bag 14a. This is illustrated generally at 20a' in FIG. 8. In this instance, since the occupant 20a' penetrates only or primarily the upper portion 102a of the air bag 14a, the resulting throttling of the vent 160a is in response only to the amount of tether displacement caused by this upper air bag penetration. The apparatus 10a may thus have a comparatively low throttling sensitivity to occupant penetration into the upper portion 102a of the air bag 14a.

As another example, the occupant 20a may penetrate both the upper portion 102a and lower portion 104a of the air bag 14a. Penetration into the lower portion 104a may occur simultaneously with penetration into the upper portion 102a, or the upper/lower penetrations may occur sequentially. Penetration into the upper portion 102a and lower portion 104a of the air bag 14a is illustrated generally at 20a" in FIG. 8. In this instance, the resulting throttling of the vent 160a is caused by the occupant 20a" penetrating into both the upper portion 102a and lower portion 104a of the air bag 14a. The apparatus 10a may thus have a comparatively high throttling sensitivity to occupant penetration into both the upper portion 102a and lower portion 104a of the air bag 14a.

As a further example, a small (e.g., 5% female) occupant (not shown in FIG. 8) may be so small as to penetrate only the lower portion 104a of the air bag 14a. In this instance, the occupant's head would penetrate the air bag 14a at a location vertically below the connection 304 of the second end 302 of the tether 150a. In this instance, the resulting throttling of the vent 160a is caused by the occupant penetrating into only the lower portion 104a of the air bag 14a. The apparatus 10a may thus have a throttling sensitivity between those where the occupant penetrates only the lower portion 104a or both the upper portion 102a and lower portion of the air bag 14a.

The throttled venting characteristics supplied to the air bag through the configuration of the vent 160, tether 150, and guide 156 described herein are not limited to the passenger frontal air bag of the illustrated embodiments. Those skilled in the art will appreciate that adaptive tether and guide configurations can be applied to other inflatable vehicle occupant protection devices, such as driver frontal air bags, driver or passenger side impact air bags and side curtain air bags, and inflatable knee bolsters, in order to achieve desired adaptive characteristics in those devices.

For a driver frontal air bag, the desired adaptive characteristics of the air bag may be similar or identical to those described herein with regard to the passenger frontal air bag of the illustrated embodiments. It thus follows that the configuration and function of the throttling vent may also be similar or identical to those described herein with regard to the passenger frontal air bags of the illustrated embodiments. Certain considerations specific to the driver air bag may, however, be taken into account. For example, those skilled in the art will appreciate that the shape and inflated depth of the driver frontal air bag will differ from that of the passenger air bag. Being deployed from the vehicle steering wheel, a driver air bag would likely have a round shape and have an inflated thickness that is substantially less than that of the passenger air bag. Therefore, those skilled in the art will appreciate that the vent may be adapted to throttle differently in response to the penetrating occupant.

More specifically, the reduced thickness of the driver air bag may affect the requisite throttling sensitivity of the vent. For the reduced thickness driver frontal air bag, strikethrough requires less occupant penetration. Therefore, it may be desirable to throttle the vent at a rate different (e.g., faster) than that of the passenger frontal air bag. This can be achieved through any of the methods described herein—by adjusting the segment angle of the tether, by increasing the number of guides, or by a combination of these methods. This can also be accounted for through the selection of the type of vent, i.e., actuated open or actuated closed. In the driver scenario, due to the reduced air bag thickness, an actuated closed vent may be desirable. An actuated closed vent on a driver frontal air bag would throttle closed in response to occupant penetration, which may be desirable so that air bag pressure increases as the occupant penetrates through the depth of the bag. Conversely, for a passenger frontal air bag, since the inflated depth is greater, an actuated open vent would allow the comparatively large volume air bag to inflate and pressurize in rapid fashion, with the throttling improving the cushioning effect as the occupant travels through ride down.

Figure 9B:
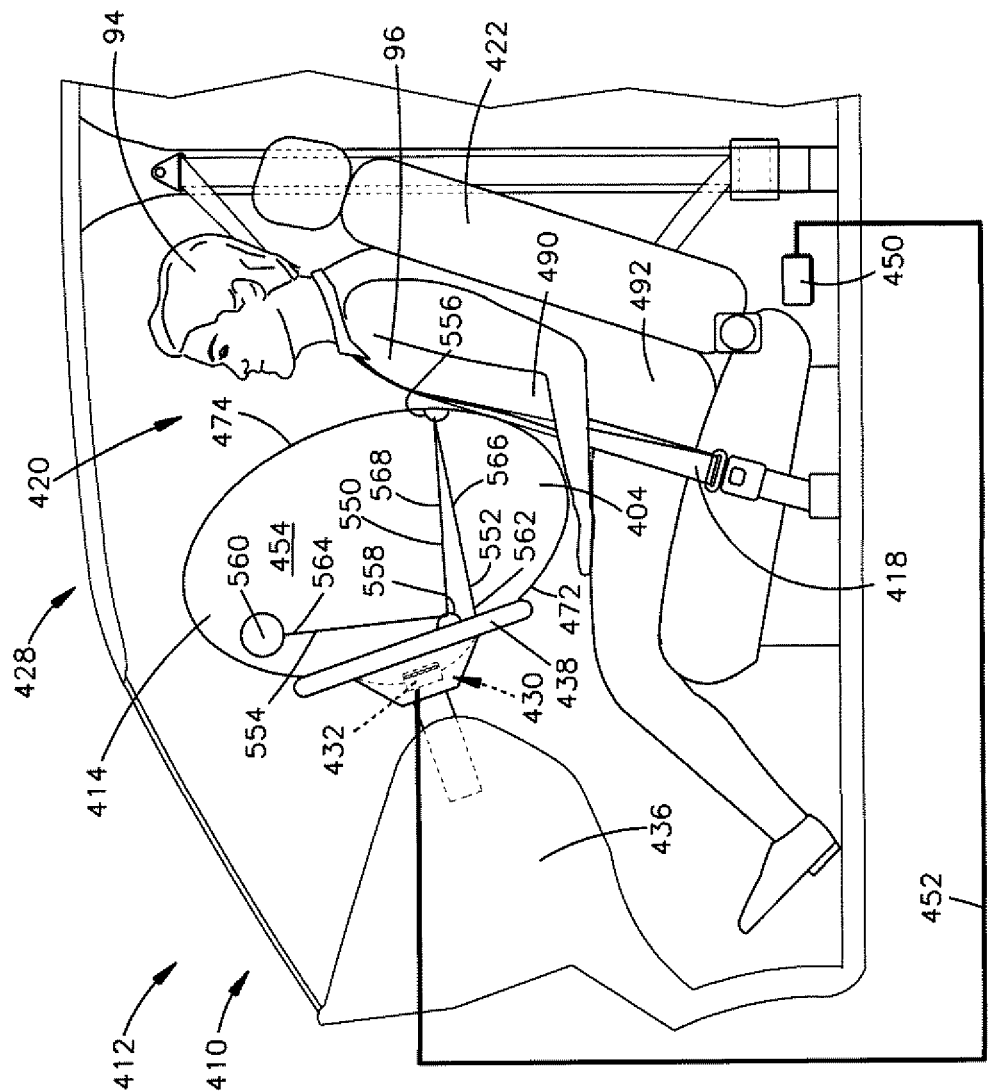

Referring to FIGS. 9A and 9B, according to another aspect of the invention, an apparatus 410 for helping to protect an occupant 420 of a vehicle 412 includes an inflatable vehicle occupant protection device 414 in the form of an air bag. In the embodiment illustrated in FIGS. 9A and 9B, the air bag 414 is a driver frontal air bag for helping to protect an occupant 420 of a seat 422 on a driver side 428 of the vehicle 412. The air bag 414 may be part of an air bag module 430 that includes an inflator 432 and that is mounted to a vehicle steering wheel 438. As shown in FIGS. 9A and 9B, the vehicle 412 also includes a seatbelt 418 for helping to protect the vehicle occupant 420.

Upon sensing the occurrence of an event for which inflation of the air bag 414 is desired, such as a vehicle collision, a sensor 450 provides a signal to the inflator 432 via lead wires 452. The inflator 432 is actuatable to provide inflation fluid to the inflatable volume 454 of the air bag 414 in a known manner. The air bag 414 inflates to a deployed condition in which the air bag helps protect the vehicle occupant 420 from impacts with parts of the vehicle 412, such as the steering wheel 438 and/or the instrument panel 436.

In the embodiment of FIGS. 9A and 9B, the air bag 414 includes a tether 550 for actuating a vent 560 for releasing inflation fluid from the inflatable volume 454 of the air bag 414. The tether 550 is adapted to actuate the vent 560 depending on vehicle or occupant conditions in the vehicle 412 both at the time of deployment and during air bag 414 deployment. In the embodiment of FIGS. 9A and 9B, the adaptive tether 550 comprises a single length of tether material that has a first connection 562 connecting a first end portion 552 of the tether to a rear panel 472 of the air bag 414. The tether 550 has a second connection 564 connecting a second end portion 554 of the tether to the vent 560.

The tether 550 extends through first and second guides 556 and 558 that are connected to the air bag 414. In the embodiment of FIGS. 9A and 9B, the first guide 556 is mounted on a front panel 474 of the air bag 414, and the second guide 558 is connected to the rear panel 472 of the air bag. The guides 556 and 558 anchor the tether 550 to the air bag and permit the tether to slide or otherwise move through their structures. The first guide 556 divides the tether 550 into first and second segments 566 and 568. The second guide 558 redirects the second segment 568 to extend in a proper direction for actuating the vent 560.

In the embodiment of FIGS. 9A and 9B, the air bag 414, adaptive tether 550, guides 556 and 558, and vent 560 are constructed, configured, and arranged to throttle the vent and thereby adapt the inflation, deployment, and pressurization of the air bag 414 depending on the penetration of the occupant into the air bag. This is accomplished in a manner similar or identical to that described herein with regard to the embodiments of FIGS. 1-8, except that the embodiment of FIGS. 9A and 9B is illustrated in a driver side implementation and that it is described herein with regard to the vent structure illustrated in FIGS. 10A-10C. This adaptive inflation, deployment, and pressurization is therefore beneficial for the same reasons and in the same manner described herein with regard to the embodiments of FIGS. 1-8. The adaptation takes place passively and accounts for vehicle/occupant conditions, such as the occupant size/weight, whether the occupant is belted or unbelted, the occupant's seat position (forward/rearward, upright/reclined), and the vehicle speed all affect the degree of occupant penetration into the air bag.

FIG. 9A illustrates a small occupant 420, such as a 5% female, in a normally seated and belted condition with the vehicle seat 422 in an upright forward positioned condition. In FIG. 9A, the seatbelt 418 serves to help restrain the occupant 420, restraining the occupant's lower torso 490 and hips 492 from moving toward the steering wheel 438. As shown in FIG. 9A, the forward position of the vehicle seat 422 positions the occupant 420 closer to the steering wheel 438 such that the occupant blocks the air bag 414 from reaching the fully inflated and deployed position. As a result, the small occupant 420 blocks the lower portion 404 of the air bag 414 and the guide 556 from reaching full deployment and tether 550 therefore wither does not actuate the vent 560 or halts actuation of the vent at the point corresponding to the degree of occupant penetration. If the occupant 420 were to move rearward due, for example, to reacting with the inflating protection device 414, the vent 550 could be throttled further toward the actuated condition. The vent 560 is thus effectively throttled in accordance with the vehicle and occupant conditions.

FIG. 9B illustrates a large occupant 420, such as a 50% male, in a normally seated and belted condition with the vehicle seat 422 in an upright mid-positioned (i.e., between full rear and full forward) condition. In FIG. 9B, the seatbelt 418 serves to help restrain the occupant 420, restraining the occupant's lower torso 490 and hips 492 from moving toward the steering wheel 438. The rear/mid-rear position of the buckled occupant 420 allows the air bag 414 to inflate and deploy with comparatively little resistance or inhibition from the occupant to a fully inflated and deployed condition. As a result, the tether 550 throttles the valve 560 fully. From the descriptions of the positions shown in FIGS. 9A and 9B, those skilled in the art will appreciate that the illustrated configuration would throttle the vent 560 between the full open and full closed condition if the position and/or size of the occupant 420 is between those illustrated in the figures.

The first guide 556, being connected to the front panel 470 at a location adjacent the mid/lower torso 490, undergoes little or no movement in response to upper body penetration of the mid-positioned belted 50% male occupant 420. The 5% female occupant 420 of FIG. 9A, however, being positioned significantly closer to the steering wheel 438, undergoes significant penetration into the air bag 414. Vehicle conditions, occupant conditions, or a combination of vehicle and occupant conditions, such as the severity of the event, the tightness of the seatbelt 418, or the position of the occupant 420 at the time the event occurs, result in a different degree of penetration of the occupant, which would create a corresponding change in valve throttling.

In the illustration of FIG. 9B, the mid/lower torso 490 and hips 492 of the occupant 420 do not penetrate into the lower portion 404 of the air bag 414. In the embodiment illustrated in FIG. 9B, the lower portion 404 is the location where the guide 556 is located. Therefore, in the case of the 50% male occupant illustrated in FIG. 9B, the lower portion 404 and the guide 556 fully deploy and the tether 550 becomes tensioned, and the tensioned tether 550 actuates the vent 560.

Those skilled in the art will appreciate that the difference in the fore/aft seat position between the 50% male in FIG. 9A and the 5% female in FIG. 9B may not be large. The difference may, for example, be as little as 50 mm. Since, however, it is the small, forward positioned 5% female (FIG. 9A) that penetrates further into the air bag 414, it is desirable to ensure that the vent 560 is throttled effectively and reliably. It is equally desirable that the vent 560 throttles differently in the case of the large mid/rear positioned 50% male occupant (FIG. 9B) that does not penetrate significantly into the air bag 414. This can be difficult, given the small difference in the positions of the two occupants.

According to the invention, the combination of the guides 556, 558 and tether 550 allow throttling the vent 560 and for adjusting the sensitivity of the throttling. By changing or adjusting the angle α at which the tether extends from the guide 556. Throttling sensitivity is maximized by configuring the tether segments 566 and 568 as close to parallel as possible, thus producing a throttling sensitivity that approaches 5:1 ($D_T:D_p$). To decrease the throttling sensitivity, the tether 550 and vent 560 combination are adjusted/configured so that the angle α is increased. As the angle α increases, the throttling sensitivity decreases, and the degree to which the tether 550 throttles the vent 560 for a given occupant penetration decreases. In the two-guide configuration of FIGS. 9A and 9B, the throttling sensitivity can be adjusted by changing the positions of the first and second guides 556 and 558.

Figure 10C:
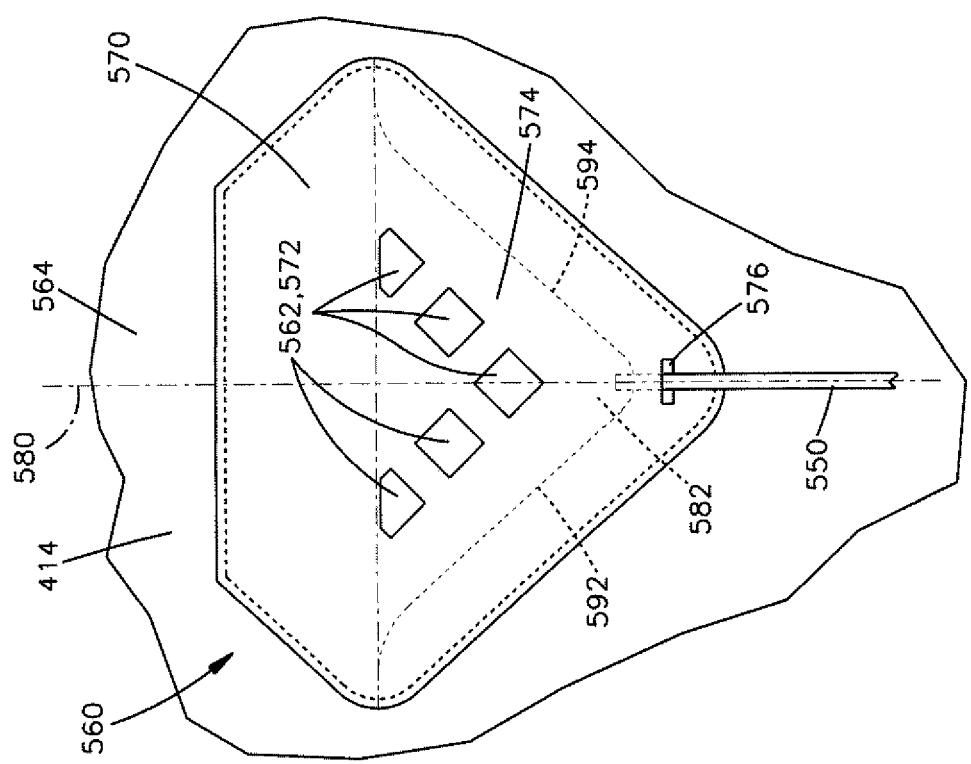

Referring to FIGS. 10A-10C, the vent 560 is an actuated closed vent that is actuatable to block inflation fluid flow from the air bag 414. The structure of the vent 560 is illustrated schematically in FIGS. 10A-10C. The vent 560 includes one or more vent openings 562 formed in an air bag panel 564, such as a side panel of the air bag 414. A vent panel 570 is secured to the side panel 564 by known means, such as stitching or ultrasonic welding, and includes one or more vent openings 572 that are aligned and correspond in shape and size with the openings 562 in the side panel 564. A vent door 574 is positioned between the side panel 564 and the vent panel 570 and has a portion connected to at least one of the side panel and vent panel by known means, such as stitching or ultrasonic welding.

The tether 550 has a first end portion secured to a leading corner 582 of the vent door 574, and extends through a guide 576 in the form of an aperture in the vent panel 570. In an open condition of the vent 560 that is secured to the air bag panel 564. The vent 560 has an open condition illustrated in FIG. 10A, in which the vent door 574 is folded or otherwise positioned so as to leave the aligned vent openings 562, 572 unobstructed, thus permitting inflation fluid to vent from the inflatable volume. The vent 560 has a closed condition illustrated in FIG. 10C, in which the vent door 574 is pulled by the tether 550 to a position completely covering the aligned vent openings 562, 572, thus blocking or at least substantially blocking inflation fluid from venting from the inflatable volume 454. The vent 560 has throttled conditions, one of which is illustrated in FIG. 10B, in which the vent door 574 is pulled by the tether to a position partially blocking or obstructing the aligned vent openings 562, 572, and thus partially permitting, i.e., throttling, inflation fluid venting from the inflatable volume.

In the embodiment illustrated in FIGS. 10A-10C, the vent openings 562, 572 are generally square/rectangular in shape and are rotated so as to be presented in a diamond shape as viewed in the figures and with respect to an axis 580 that extends in the general direction of tension applied to the tether 550. The vent panel 570 is also has a generally square/rectangular configuration and is rotated to a diamond-shaped orientation as viewed in the figures and with respect to the axis 580. The diamond shape of the vent panel 570 thus corresponds to the diamond shapes of the vent openings 562, 672.

The vent openings 562, 572 are arranged in rows that extend along divergent paths. In the illustrated embodiment, these rows of openings 562, 572 extend parallel to adjacent edges of the vent panel 570 and to corresponding leading edges 592, 594 of the vent door 574. Thus, as the vent door 574 moves from the open condition of FIG. 10A toward the closed condition of FIG. 10C, the divergent leading edges of the vent door cover/obstruct/block the openings in a substantially uniform manner. This is best illustrated in FIG. 10B. Those skilled in the art will appreciate that the vent openings 562, 572, may have different shapes and may be arranged in different configurations without departing from the spirit of the invention. Those skilled in the art will also appreciate that the vent panel 570 and 574 may have different configurations commensurate with the varied shapes and arrangements of the vent openings 562, 572.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, the apparatus comprising:
    an inflatable vehicle occupant protection device inflatable between a vehicle surface and the vehicle occupant;
    a vent for releasing inflation fluid from the protection device, the vent comprising a vent opening with a flow area that can be adjusted to throttle inflation fluid flow through the vent;
    a tether having a first connection with the vent and a second connection with the protection device, the second connection of the tether being positioned on the protection device such that deployment of the protection device throttles the vent toward an actuated condition, and occupant penetration into the protection device throttles the vent toward a non-actuated condition, and
    a guide connected to the protection device, the tether extending through the guide, wherein the guide is positioned on the protection device to move with the protection device in response to occupant penetration into the protection device, and wherein this guide movement causes the tether to slide through the guide and thereby throttle the vent;
    wherein one of the non-actuated and actuated conditions is a closed condition blocking inflation fluid flow through the vent.

2. The apparatus recited in claim 1, wherein the actuated condition comprises an open condition and the non-actuated condition comprises a closed condition.

3. The apparatus recited in claim 1, wherein the actuated condition comprises a closed condition and the non-actuated condition comprises an open condition.

4. The apparatus recited in claim 1, wherein the guide is positioned on the protection device at a location where occupant penetration into the protection device is likely.

5. The apparatus recited in claim 1, wherein:
    the vent is configured such that inflation fluid pressure in the protection device biases the vent toward a first condition and the tether maintains the vent in a second condition when the protection device is fully deployed; and
    the tether is configured such that movement of the guide in response to occupant penetration causes movement of the tether that throttles a valve by permitting the valve to move under the bias of inflation fluid pressure toward the first condition.

6. The apparatus recited in claim 1, wherein the throttling of the vent is in proportion to occupant penetration into the protection device.

7. The apparatus recited in claim 6, wherein the proportion of occupant penetration to vent throttling is about 2:1.

8. The apparatus recited in claim 6, wherein the proportion of occupant penetration to vent throttling can be adjusted by adjusting the position of at least one of the vent, first connection, second connection, and guide on protection device.

9. The apparatus recited in claim 6, wherein the guide divides the tether into first and second segments that extend at an angle relative to each other, the angle helping to determine the proportion of occupant penetration to vent throttling.

10. The apparatus recited in claim 1, wherein the location of the first and second connections in combination with the location of the guide determines a tether angle that determines the throttling sensitivity of the tether.

11. The apparatus recited in claim 1, wherein the tether is configured to move through the guide in order to translate movement of the protection device into throttling of the vent.

12. The apparatus recited in claim 1, wherein the vent is configured to be placed in a closed condition in response to the protection device reaching a fully deployed condition, the tether throttling the vent toward the open condition in response to the occupant penetration.

13. The apparatus recited in claim 1, wherein the vent is configured to be placed in an open condition in response to the protection device reaching a fully deployed condition, the tether throttling the vent toward the closed condition in response to the occupant penetration.

14. The apparatus recited in claim 1, wherein the guide comprises a loop of material fastened to a front panel of the protection device.

15. The apparatus recited in claim 1, wherein the guide is connected to a front panel of the protection device at a location where occupant torso penetration into the protection device is likely.

16. The apparatus recited in claim 1, wherein the guide is connected to a front panel of the protection device at a location occupant head penetration into the protection device is likely.

17. The apparatus recited in claim 1, wherein the second connection is positioned on the protection device such that a large occupant initially penetrates into the protection device at the location of the second connection and thereby throttles the vent due to displacement of the second connection upon initial penetration, and a small occupant initially penetrates into the protection device below the second connection and thereby does not throttle the vent due to displacement of the second connection upon initial penetration.

18. The apparatus recited in claim 17, wherein the large occupant is a 50% male occupant and the small occupant is a 5% female occupant.

19. The apparatus recited in claim 17, further comprising at least one guide connected to the protection device, the tether extending through the guide, wherein the guide is positioned on the protection device to move with the protection device in response to occupant penetration into the protection device, and wherein this guide movement causes the tether to slide through the guide and thereby throttle the vent.

20. The apparatus recited in claim 19, wherein the guide is positioned on the protection device such that initial penetration of both the large and small occupants causes the guide to move and thereby throttle the vent.

21. The apparatus recited in claim 19, wherein the position of the second connection on the protection device is proximate the location where a head of the large occupant initially impacts the protection device and above the location where a head of the small occupant initially impacts the protection device, and the position of the guide on the protection device being proximate the location where a thorax of both the large and small occupants initially impact the protection device.

22. The apparatus recited in claim 1, wherein the guide comprises a plurality of guides and the tether extends through each of the plurality of guides, the tether being configured and arranged to extend through the plurality of guides so that the movement of any of the guides due to occupant penetration into the protection device throttles the valve with a ratio of occupant penetration to valve throttling is greater than 1:1.

23. The apparatus recited in claim 1, wherein the guide comprises a plurality of guides and the tether extends through each of the plurality of guides, the second connection of the tether being located on a front panel of the protection device at a location where an occupant head is likely to strike the protection device, and one of the guides is connected to the front panel at a location where an occupant torso is likely to strike the protection device.

24. An apparatus for helping to protect an occupant of a vehicle, the apparatus comprising:
an inflatable vehicle occupant protection device inflatable between a vehicle surface and the vehicle occupant;
a vent for releasing inflation fluid from the protection device; and
a tether having a first connection with the vent and a second connection with the protection device, the second connection being positioned on the protection device such that initial large occupant penetration into the protection device at the location of the second connection throttles the vent due to displacement of the second connection upon initial penetration, and initial small occupant penetration into the protection device below the second connection does not throttle the vent due to displacement of the second connection upon initial penetration;
the apparatus further comprising at least one guide connected to the protection device, the tether extending through the guide, wherein the guide is positioned on the protection device to move with the protection device in response to occupant penetration into the protection device, and wherein this guide movement causes the tether to slide through the guide and thereby throttle the vent, wherein the guide is positioned on the protection device such that each of initial large and small occupant penetration causes the guide to move and thereby throttle the vent.

25. The apparatus recited in claim 24, wherein the initial large occupant penetration is caused by a 50% male occupant and the initial small occupant penetration is caused by a 5% female occupant.

26. The apparatus recited in claim 24, wherein the vent comprises a vent opening with a flow area that can be adjusted to throttle inflation fluid flow through the vent in response to tether movement, penetration into the protection device at the location of the second connection causing tether movement that alters the tension on the tether and thereby throttles the vent.

27. The apparatus recited in claim 24, wherein the position of the second connection on the protection device is proximate the location where a head of the large occupant initially impacts the protection device and above the location where a head of the small occupant initially impacts the protection device, and the position of the guide on the protection device being proximate the location where a thorax of both the large and small occupants initially impact the protection device.

28. An apparatus for helping to protect an occupant of a vehicle, the apparatus comprising:
an inflatable vehicle occupant protection device inflatable between a vehicle surface and the vehicle occupant;
a vent for releasing inflation fluid from the protection device, the vent comprising a vent opening with a flow area that can be adjusted to throttle inflation fluid flow through the vent, wherein the vent has a condition that blocks inflation fluid flow through the vent;
a tether having a first connection with the vent and a second connection with the protection device, tension on the tether throttling the vent; and
a guide connected to the protection device, the tether extending through the guide, wherein the guide is positioned on the protection device to move with the protection device in response to occupant penetration into the protection device, and wherein this guide movement causes the tether to slide through the guide and thereby throttle the vent.

* * * * *